(12) United States Patent
Gonion

(10) Patent No.: US 9,817,663 B2
(45) Date of Patent: Nov. 14, 2017

(54) ENHANCED MACROSCALAR PREDICATE OPERATIONS

(71) Applicant: Apple Inc., Cupertino, CA (US)

(72) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 379 days.

(21) Appl. No.: 14/218,287

(22) Filed: Mar. 18, 2014

(65) Prior Publication Data

US 2014/0289496 A1 Sep. 25, 2014

Related U.S. Application Data

(60) Provisional application No. 61/803,171, filed on Mar. 19, 2013.

(51) Int. Cl.
G06F 9/30 (2006.01)
G06F 9/345 (2006.01)
G06F 9/38 (2006.01)

(52) U.S. Cl.
CPC ........ *G06F 9/30036* (2013.01); *G06F 9/3013* (2013.01); *G06F 9/30032* (2013.01); *G06F 9/30043* (2013.01); *G06F 9/30072* (2013.01); *G06F 9/30076* (2013.01); *G06F 9/30109* (2013.01); *G06F 9/30112* (2013.01); *G06F 9/30192* (2013.01); *G06F 9/345* (2013.01); *G06F 9/3838* (2013.01)

(58) Field of Classification Search
None
See application file for complete search history.

(56) References Cited

U.S. PATENT DOCUMENTS

| 4,873,630 A | 10/1989 | Rusterholz et al. |
| 4,890,220 A | 12/1989 | Nakagawa et al. |
| 5,151,991 A | 9/1992 | Iwasawa et al. |
| 5,228,131 A | 7/1993 | Ueda et al. |

(Continued)

FOREIGN PATENT DOCUMENTS

| EP | 0649086 | 4/1995 |
| JP | H11-85515 | 3/1999 |

(Continued)

OTHER PUBLICATIONS

Notification of the Second Office Action in Chinese Application No. 201310112340.9, dated Sep. 24, 2015, 10 pages.

(Continued)

*Primary Examiner* — Corey S Faherty
(74) *Attorney, Agent, or Firm* — Rory D. Rankin; Meyertons, Hood, Kivlin, Kowert & Goetzel P.C.

(57) ABSTRACT

Systems, apparatuses and methods for utilizing enhanced macro scalar predicate operations which take enhanced predicate operands that designate the element width and which elements are to be processed. The element width and the number of elements per vector are determined at run-time rather than being defined in the architectural definition of the instruction. This enables additional parallelism when processing smaller-sized data. The instruction performs the requested operation on the elements specified by the enhanced control predicate, assuming an element-width also specified by the enhanced control predicate, and returns the result as an enhanced predicate of the same element width.

20 Claims, 9 Drawing Sheets

(56) References Cited

U.S. PATENT DOCUMENTS

| | | | |
|---|---|---|---|
| 5,381,536 A | 1/1995 | Phelps et al. | |
| 5,430,884 A | 7/1995 | Beard et al. | |
| 5,481,746 A | 1/1996 | Schiffleger et al. | |
| 5,537,562 A | 7/1996 | Gallup et al. | |
| 5,548,768 A | 8/1996 | Gallup et al. | |
| 5,553,309 A | 9/1996 | Asai et al. | |
| 5,623,650 A | 4/1997 | Beard et al. | |
| 5,634,023 A | 5/1997 | Adler et al. | |
| 5,680,338 A | 10/1997 | Agarwal et al. | |
| 5,727,229 A | 3/1998 | Kan et al. | |
| 5,781,752 A | 7/1998 | Moshovos et al. | |
| 5,903,750 A | 5/1999 | Yeh et al. | |
| 5,953,241 A | 9/1999 | Hansen et al. | |
| 5,991,785 A | 11/1999 | Alidina et al. | |
| 6,058,465 A * | 5/2000 | Nguyen | G06F 9/30036 708/441 |
| 6,098,162 A | 8/2000 | Schiffleger et al. | |
| 6,115,808 A | 9/2000 | Arora | |
| 6,295,597 B1 | 9/2001 | Resnick et al. | |
| 6,295,599 B1 | 9/2001 | Hansen et al. | |
| 6,301,706 B1 | 10/2001 | Maslennikov et al. | |
| 6,308,250 B1 | 10/2001 | Klausler | |
| 6,324,638 B1 | 11/2001 | Elmer et al. | |
| 6,470,440 B1 | 10/2002 | Nguyen et al. | |
| 6,542,918 B1 | 4/2003 | Vishkin | |
| 6,584,482 B1 | 6/2003 | Hansen et al. | |
| 6,643,765 B1 | 11/2003 | Hansen et al. | |
| 6,725,356 B2 | 4/2004 | Hansen et al. | |
| 6,959,378 B2 | 10/2005 | Nickolls et al. | |
| 6,988,183 B1 | 1/2006 | Wong | |
| 7,213,131 B2 | 5/2007 | Hansen et al. | |
| 7,216,217 B2 | 5/2007 | Hansen et al. | |
| 7,260,708 B2 | 8/2007 | Hansen et al. | |
| 7,301,541 B2 | 11/2007 | Hansen et al. | |
| 7,307,453 B1 | 12/2007 | Maitland et al. | |
| 7,353,367 B2 | 4/2008 | Hansen et al. | |
| 7,363,574 B1 | 4/2008 | Maitland et al. | |
| 7,430,655 B2 | 9/2008 | Hansen et al. | |
| 7,464,252 B2 | 12/2008 | Hansen et al. | |
| 7,509,366 B2 | 3/2009 | Hansen | |
| 7,516,308 B2 | 4/2009 | Hansen et al. | |
| 7,571,302 B1 | 8/2009 | Chen et al. | |
| 7,653,806 B2 | 1/2010 | Hansen et al. | |
| 7,660,972 B2 | 2/2010 | Hansen et al. | |
| 7,660,973 B2 | 2/2010 | Hansen et al. | |
| 7,725,518 B1 | 5/2010 | Le Grand | |
| 7,725,520 B2 | 5/2010 | Sakaguchi et al. | |
| 7,730,287 B2 | 6/2010 | Hansen et al. | |
| 7,873,812 B1 | 1/2011 | Mimar | |
| 7,900,025 B2 | 3/2011 | Gschwind | |
| 8,010,953 B2 | 8/2011 | Gschwind | |
| 8,078,847 B2 | 12/2011 | Gonion et al. | |
| 8,131,979 B2 | 3/2012 | Gonion et al. | |
| 8,243,100 B2 | 8/2012 | Krithivasan et al. | |
| 8,261,043 B2 | 9/2012 | Inoue et al. | |
| 8,364,938 B2 | 1/2013 | Gonion et al. | |
| 2001/0032308 A1 | 10/2001 | Grochowski et al. | |
| 2003/0159017 A1 | 8/2003 | Barlow et al. | |
| 2003/0167460 A1 | 9/2003 | Desai et al. | |
| 2004/0044882 A1 | 3/2004 | Asaad et al. | |
| 2004/0073773 A1 | 4/2004 | Demjanenko | |
| 2005/0240644 A1 | 10/2005 | Van Berkel et al. | |
| 2006/0004996 A1 | 1/2006 | Gonion | |
| 2006/0041610 A1 | 2/2006 | Hokenek et al. | |
| 2006/0168432 A1 | 7/2006 | Caprioli et al. | |
| 2008/0288744 A1 | 11/2008 | Gonion et al. | |
| 2008/0288745 A1 | 11/2008 | Gonion et al. | |
| 2008/0288754 A1 | 11/2008 | Gonion et al. | |
| 2008/0317150 A1 | 12/2008 | Alexander et al. | |
| 2009/0089542 A1 | 4/2009 | Laine et al. | |
| 2009/0132878 A1 | 5/2009 | Garland et al. | |
| 2009/0150657 A1 | 6/2009 | Gschwind et al. | |
| 2009/0172348 A1 | 7/2009 | Cavin | |
| 2009/0172360 A1 | 7/2009 | Hikichi | |
| 2009/0240366 A1 | 9/2009 | Kaushal et al. | |
| 2009/0249026 A1 | 10/2009 | Smelyanskiy et al. | |
| 2010/0042789 A1 | 2/2010 | Gonion et al. | |
| 2010/0042807 A1 | 2/2010 | Gonion et al. | |
| 2010/0042815 A1 | 2/2010 | Gonion et al. | |
| 2010/0042816 A1 | 2/2010 | Gonion et al. | |
| 2010/0042817 A1 | 2/2010 | Gonion et al. | |
| 2010/0042818 A1 | 2/2010 | Gonion et al. | |
| 2010/0049950 A1 | 2/2010 | Gonion et al. | |
| 2010/0049951 A1 | 2/2010 | Gonion et al. | |
| 2010/0058037 A1 | 3/2010 | Gonion et al. | |
| 2010/0077180 A1 | 3/2010 | Gonion et al. | |
| 2010/0077182 A1 | 3/2010 | Gonion et al. | |
| 2010/0077183 A1 | 3/2010 | Gonion et al. | |
| 2010/0095087 A1 | 4/2010 | Eichenberger et al. | |
| 2010/0115233 A1 | 5/2010 | Brewer et al. | |
| 2010/0274988 A1 | 10/2010 | Mimar | |
| 2010/0325398 A1 | 12/2010 | Gonion et al. | |
| 2010/0325399 A1 | 12/2010 | Gonion et al. | |
| 2010/0325483 A1 | 12/2010 | Gonion et al. | |
| 2011/0035567 A1 | 2/2011 | Gonion et al. | |
| 2011/0035568 A1 | 2/2011 | Gonion et al. | |
| 2011/0071136 A1 | 3/2011 | Haddach et al. | |
| 2011/0093681 A1 | 4/2011 | Gonion et al. | |
| 2011/0113217 A1 | 5/2011 | Gonion et al. | |
| 2011/0145543 A1 * | 6/2011 | Damron | G06F 9/30014 712/3 |
| 2011/0276782 A1 | 11/2011 | Gonion et al. | |
| 2011/0283092 A1 | 11/2011 | Gonion | |
| 2012/0060020 A1 | 3/2012 | Gonion et al. | |
| 2012/0079466 A1 | 3/2012 | Gonion | |
| 2012/0166761 A1 | 6/2012 | Hughes et al. | |
| 2012/0204007 A1 | 8/2012 | Reid | |
| 2014/0025938 A1 | 1/2014 | Gonion | |
| 2014/0059328 A1 | 2/2014 | Gonion | |
| 2014/0149724 A1 * | 5/2014 | Valentine | G06F 9/3001 712/226 |
| 2014/0281405 A1 | 9/2014 | Streett et al. | |

FOREIGN PATENT DOCUMENTS

| | | |
|---|---|---|
| JP | 2000-322257 | 11/2000 |
| JP | 2008-529191 | 7/2008 |
| JP | 2010-152843 | 7/2010 |
| JP | 2010-524107 | 7/2010 |
| JP | 2013-175201 | 9/2013 |
| TW | 200951811 | 12/2009 |
| TW | 201030610 | 8/2010 |
| TW | 201224933 | 6/2012 |
| WO | 2008/029450 | 3/2008 |

OTHER PUBLICATIONS

Office Action in Taiwanese Application No. 102111747, dated May 7, 2015, 14 pages.

Notification of the First Office Action in Chinese Application No. 201310112340.9, dated Feb. 28, 2015, 35 pages.

Office Action in U.S. Appl. No. 131437,482 dated Mar. 3, 2015, 4 pages.

International Search Report and Written Opinion in Application No. PCT/US13/34360, dated Jul. 25, 2013, 9 pages.

Notice of Preliminary Rejection in Korean Application No. 10-2013-35807, dated Jun. 30, 2014, 3 pages.

Office Action in Japanese Patent Application No. 2013-87861, dated Aug. 6, 2014, 25 pages.

Manne, et al. "Pipeline Gating: Speculation Control for Energy Reduction," Proceedings of the 25th annual International Symposium on Computer Architecture, IEEE, Jun. 27, 1998, pp. 132-141.

Office Action in Japanese Patent Application No. 2013-87861 dated Jan. 5, 2015, 8 pages.

Kim, et al., "Wish Branches: Combining Conditional Branching and Predication for Adaptive Predicated Execution," International Symposium on Microarchitecture—MICRO, 2005, pp. 43-54.

Office Action in Taiwanese Application No. 102130104 dated Jan. 19, 2015, 18 pages.

International Search Report and Written Opinion in Application No. PCT/US2013/055853 dated Dec. 5, 2013, 10 pages.

(56) References Cited

OTHER PUBLICATIONS

Ando, et al., "Unconstrained Speculative Execution with Predicated State Buffering," Proceedings of the 22nd Annual Symposium on Computer Architecture, Jun. 22-24, 1995, XP000687802, pp. 126-137.
Hara, et al., "Performance Comparison of ILP Machines with Cycle Time Evaluation", 23rd Annual International Symposium on Computer Architecture, May 22-24, 1996, pp. 213-224.
Bringmann, et al., "Speculative Execution Exception Recovery using Write-back Suppression", Proceedings of the 26th Annual International Symposium on Microarchitecture, Dec. 1, 1993, pp. 214-223, IEEE Computer Society Press, Los Alamitos, CA, USA.
Mahlke, et al., "Effective Compiler Support for Predicated Execution Using the Hyperblock", Proceedings of the 25th Annual International Symposium on Microarchitecture, Dec. 10, 1992, pp. 45-54, IEEE Computer Society Press, Los Alamitos, CA, USA.

* cited by examiner

Source Code

```
r = 0 ;
s = 0 ;
for (x=0; x<KSIZE; ++x)
{
    if (A[x] < FACTOR)
    {
        r = A[x+s] ;
    {
    else
    {
        s = A[x+r] ;
    }
    B[x] = r + s ;
}
```

FIG. 5A

Vectorized Code

```
r = 0 ;
s = 0 ;
x = VectorIndex (0,1) ;
goto Loop1Tail ;
Loop1:
    s = PropagatePriorF (s,p0) ;
    ~p0; t = VectorReadInt (A, x) ;
    p1 = (t < FACTOR) ;
    i2 = ConditionalStop (p1, kTF | kFT) ;
    p2 = 0 ;
Loop2:
    !p0; p2 = GeneratePredicates (p2, i2) ;
    ~p2; t = VectorTest (p1) ;
    if ( !FIRST () ) goto Skip1 ;
    t1 = x + s ;
    ~p2; r = VectorReadInt (A, t1) ;
    goto Skip2 ;
Skip1 :
    r = PropagatePriorF (r, p2) ;
    t2 = x + r ;
    ~p2; s = VectorReadInt (A, t2) ;
    s = PropagatePostT (s, s, p2) ;
Skip2 :
    if ( !CARRY () ) goto Loop2 ;
    v = r + s ;
    ~p0; s = VectorWriteInt (B, x, v) ;
    x += VECLEN ;
Loop1Tail:
    p0 = (x < KSIZE) ;
    if ( FIRST (p0) ) goto Loop1 ;
```

FIG. 5B

Example 2A
Vectorized
(Non-Speculative)

```
j = 0;
x = VectorIndex (0,1) ;
goto Loop1Tail;
Loop1:
    p3 = 0;
    j = PropagatePriorF (j, p0) ;
    ~p0; t = VectorReadInt (A, x) ;
    p1 = t < FACTOR;
    p2 = ConditionalStop (p1, kTT | kTF) ;
Loop2:
    t = x + j ;
    !p0; p3 = GeneratePredicates (p3, p2) ;
    ~p3; t = VectorTest (p1) ;
    if ( NONE () ) goto Loop2Tail ;
    !p3; p4 = p1 + 0;
    ~p4; j = VectorRead (A, t) ;
    j = PropagatePostT (j, j, p4) ;
Loop2Tail:
    if ( !CARRY () ) goto Loop2
    ~p0; VectorWrite (B, x, j) ;
    x += VECLEN;
Loop1Tail:
    p0 = (x < KSIZE) ;
    if ( FIRST () ) goto Loop1;
```

*FIG. 6A*

Example 2B
Vectorized
(Speculative)

```
j = 0;
x = VectorIndex (0,1) ;
goto Loop1Tail ;
Loop1:
    p3 = 0 ;
    j = PropagatePriorF (j, p0) ;
Loop2:
    !p0; p5 = Remaining (p3) ;
    ~p5; t = x + j ;
    ~p5; t = VectorReadIntFF (A, t, ps) ;
    ~p5; p5 &= ps ;
    ~p5; p1 (t < FACTOR) ;
    !p5; i2 = ConditionalStop (p1, kTT | kTF) ;
    !p0; p3 = GeneratePredicates (p3, i2) ;
    ~p3; VectorTest (p1) ;
    ~p3; if (NONE () ) goto Loop2Tail ;
    !p3; p4 = p1 + 0 ;
    ~p4; j = VectorRead (A, x) ;
    j = PropagatePostT (j, j, p4) ;
Loop2Tail:
    ~p0; VectorTest (p3) ;
    if ( !LAST () ) goto Loop2 ;
    ~p0; VectorWrite (B, x, j) ;
    x += VECLEN ;
Loop1Tail:
    p0 = (x < KSIZE) ;
    if ( FIRST () ) goto Loop1 ;
```

*FIG. 6B*

Example 3
Vectorized

```
            x = VectorIndex (0,1) ;
            goto Loop1Tail ;
Loop1:
            ~p0; r = VectorReadInt(C,x);
            ~p0; s = VectorReadInt (D, x) ;
            i1 = CheckHazardP(r,x,p0);
            i2 = CheckHazardP(s,x,p0);
            i3 = VectorMax(i1,i2);
            p4 = 0 ;
Loop2:
            ~p0; p4 = GeneratePredicates (p4, i3) ;
            ~p4; t1 = VectorReadInt(A,r) ;
            ~p4; t2 = VectorReadInt(A,s);
            ~p4; t3 = t1 + t2 ;
            ~p4; VectorWriteInt(A,x,t3);
            ~p0; if (!CARRY( )) goto Loop2;
            x += VECLEN;
Loop1Tail:
            p0 = (x < KSIZE) ;
            if ( FIRST (p0) ) goto Loop1 ;
```

FIG. 7

Example 4
Vectorized

```
        x = VectorIndex (0,1) ;
        goto Loop1Tail ;
Loop1:
        j = PropagatePriorF(j,p0);
        ~p0; f = VectorReadInt(A,x);
        ~p0; g = VectorReadInt (B, x) ;
        !p0; p1 = (f < FACTOR);
        !p0; p2 = (g < FACTOR);
        ~p1; h = VectorReadInt(C,x);
        ~p2; i = VectorReadInt(D,x);
        !p1; ix = CheckHazardP(h,i,p2);
        p3 = 0 ;
Loop2:
        p3 = GeneratePredicates (p3, ix) ;
        !p3; p4 = p1 + 0;
        !p3; p5 = p2 + 0;
        ~p4; j = VectorReadInt(E,h);
        j = CopyPropagate(j,j,p4);
        ~p5; VectorWriteInt(E,i,j);
        ~p0; if (!LAST(p3)) goto Loop2;
        x += VECLEN;
Loop1Tail:
        p0 = (x < KSIZE) ;
        if ( FIRST (p0) ) goto Loop1 ;
```

FIG. 8

ENHANCED MACROSCALAR PREDICATE OPERATIONS

PRIORITY INFORMATION

This application claims benefit of priority of U.S. Provisional Application No. 61/803,171, filed Mar. 19, 2013, the entirety of which is incorporated herein by reference.

BACKGROUND

Field of the Invention

This disclosure relates to vector processing, and more particularly to the implementation of enhanced Macroscalar predicate operations.

Description of the Related Art

Vector processors have traditionally been utilized to exploit data-level parallelism (DLP) in software programs. The architecturally fixed-width element width of conventional vectors can present challenges in exploiting the potential parallelism available with data elements that are smaller than the element width. For example, if a processor supports concurrent operations on vectors of 32-bit elements, but a particular vector has elements that are only 8 or 16 bits wide, then processing resources that are fully utilized when operating on vectors of 32-bit elements may be underutilized when operating on the smaller-element vectors.

SUMMARY

Systems, apparatuses, and methods utilizing enhanced Macroscalar predicate operations are disclosed. Enhanced Macroscalar predicate operations receive an enhanced control predicate operand that designates the element width and which elements are to be processed. This allows both the element width and the number of elements per input predicate to be determined at run-time and thus be undefined in the architectural definition of the instruction. This further enables additional parallelism when processing smaller-sized data.

In an embodiment, a processor may implement a vector instruction set including enhanced Macroscalar predicate instructions. The instructions perform the requested operation on the elements specified by the enhanced control predicate, assuming an element-size also specified by the enhanced control predicate, and return the result as an enhanced predicate of the same element size.

In various embodiments, a vector execution unit may be configured to execute the enhanced Macroscalar predicate operations. The architecture of the vector execution unit may be vector-length agnostic to allow it to adapt parallelism at runtime. More particularly, when instructions or operations are vector-length agnostic, the operation may be executed using predicate vectors of any length, up to the limitations imposed by the supporting hardware. For example, in embodiments in which vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware. In such embodiments, a compiler generates or a programmer writes program code that need not rely on (or use) a specific vector length. In some embodiments, it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length may be read from a system register during runtime. Consequently, as process technology allows longer vectors, execution of legacy binary code simply speeds up without any effort by software developers.

These and other features and advantages will become apparent to those of ordinary skill in the art in view of the following detailed descriptions of the approaches presented herein.

BRIEF DESCRIPTION OF THE DRAWINGS

FIG. 4A is a diagram illustrating a sequence of variable states during scalar execution of the loop shown in Example 1.

FIG. 4B is a diagram illustrating a progression of execution for Macroscalar vectorized program code of the loop of Example 1.

FIG. 5A and FIG. 5B are diagrams illustrating one embodiment of the vectorization of program source code.

FIG. 6A is a diagram illustrating one embodiment of non-speculative vectorized program code.

FIG. 6B is a diagram illustrating another embodiment of speculative vectorized program code.

FIG. 7 is a diagram illustrating one embodiment of vectorized program code.

FIG. 8 is a diagram illustrating another embodiment of vectorized program code.

Figure 1:
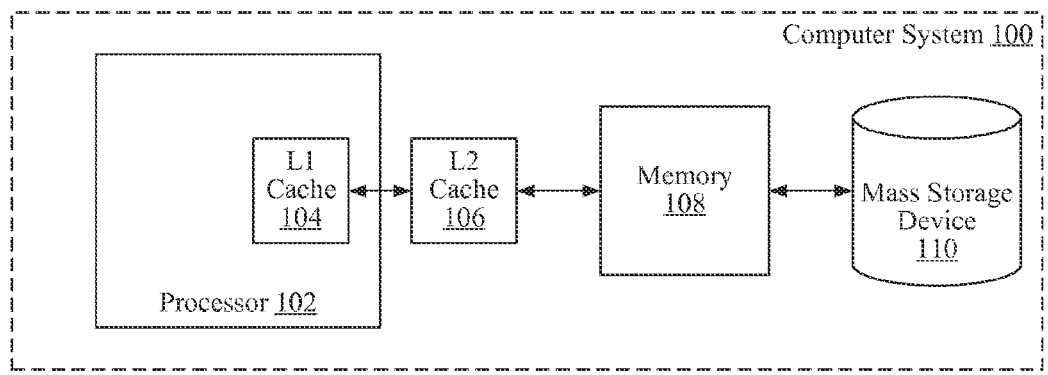
FIG. 1 is a block diagram of one embodiment of a computer system.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Computer System Overview

Turning now to FIG. 1, a block diagram of one embodiment of a computer system is shown. Computer system 100 includes a processor 102, a level two (L2) cache 106, a memory 108, and a mass-storage device 110. As shown, processor 102 includes a level one (L1) cache 104. It is noted that although specific components are shown and described in computer system 100, in alternative embodiments different components and numbers of components may be present in computer system 100. For example, computer system 100 may not include some of the memory hierarchy (e.g., memory 108 and/or mass-storage device 110). Alternatively, although the L2 cache 106 is shown external to the processor 102, it is contemplated that in other embodiments, the L2 cache 106 may be internal to the processor 102. It is further noted that in such embodiments, a level three (L3) cache (not shown) may be used. In addition, computer system 100 may include graphics processors, video cards, video-capture devices, user-interface devices, network cards, optical drives, and/or other peripheral devices that are coupled to processor 102 using a bus, a network, or another suitable communication channel (all not shown for simplicity).

In various embodiments, processor 102 may be representative of a general-purpose processor that performs computational operations. For example, processor 102 may be a central processing unit (CPU) such as a microprocessor, a microcontroller, an application-specific integrated circuit (ASIC), or a field-programmable gate array (FPGA). However, as described further below, processor 102 may include one or more mechanisms for vector processing (e.g., vector execution units). An example vector execution unit of processor 102 is described in greater detail below in conjunction with the description of FIG. 2.

The mass-storage device 110, memory 108, L2 cache 106, and L1 cache 104 are storage devices that collectively form a memory hierarchy that stores data and instructions for processor 102. More particularly, the mass-storage device 110 may be a high-capacity, non-volatile memory, such as a disk drive or a large flash memory unit with a long access time, while L1 cache 104, L2 cache 106, and memory 108 may be smaller, with shorter access times. These faster semiconductor memories store copies of frequently used data. Memory 108 may be representative of a memory device in the dynamic random access memory (DRAM) family of memory devices. The size of memory 108 is typically larger than L1 cache 104 and L2 cache 106, whereas L1 cache 104 and L2 cache 106 are typically implemented using smaller devices in the static random access memories (SRAM) family of devices. In some embodiments, L2 cache 106, memory 108, and mass-storage device 110 are shared between one or more processors in computer system 100.

In some embodiments, the devices in the memory hierarchy (i.e., L1 cache 104, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 100). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 110, memory 108, L2 cache 106, and L1 cache 104 are all examples of non-transitory computer readable storage devices.

Processor

Figure 2:
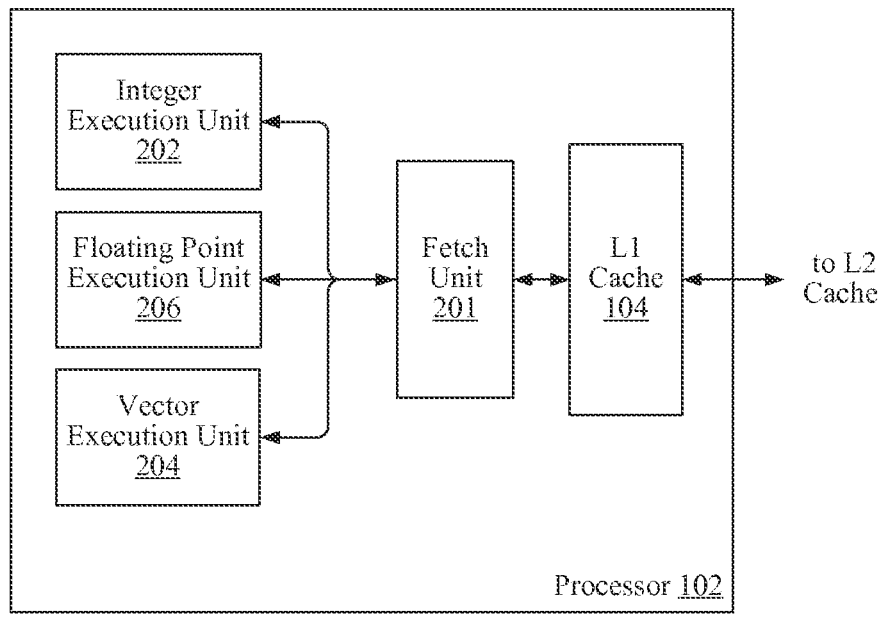
FIG. 2 is a block diagram illustrating additional details of an embodiment of the processor shown in FIG. 1.

Referring to FIG. 2, a block diagram illustrating additional details of an embodiment of the processor of FIG. 1 is shown. In the embodiment shown in FIG. 2, processor 102 may include a number of pipeline stages, although for brevity not all are shown in FIG. 2. Accordingly, as shown, processor 102 includes L1 cache 104, an instruction fetch unit 201, an integer execution unit 202, a floating-point execution unit 206, and a vector execution unit 204. It is noted that integer execution unit 202, floating-point execution unit 206, and vector execution unit 204 as a group may be interchangeably referred to as "the execution units."

In various embodiments, the execution units may perform computational operations such as logical operations, mathematical operations, or bitwise operations, for example, for an associated type of operand. More specifically, integer execution unit 202 may perform computational operations that involve integer operands, floating-point execution unit 206 may perform computational operations that involve floating-point operands, and vector execution unit 204 may perform computational operations that involve vector operands. Any suitable configurations may be employed for integer execution unit 202 and floating-point execution unit 206, depending on the particular configuration of architectural and performance parameters governing a particular processor design. As noted above, although the embodiment of processor 102 shown in FIG. 2 includes a particular set of components, it is contemplated that in alternative embodiments processor 102 may include different numbers or types of execution units, functional units, and pipeline stages such as an instruction decode unit, a scheduler or reservations station, a reorder buffer, a memory management unit, I/O interfaces, etc. that may be coupled to the execution units.

The vector execution unit 204 may be representative of a single-instruction-multiple-data (SIMD) execution unit in the classical sense, in that it may perform the same operation on multiple data elements in parallel. However, it is noted that in some embodiments, the vector instructions described here may differ from other implementations of SIMD instructions. For example, in an embodiment, elements of a vector operated on by a vector instruction may have a size that does not vary with the number of elements in the vector. By contrast, in some SIMD implementations, data element size does vary with the number of data elements operated on (e.g., a SIMD architecture might support operations on eight 8-bit elements, but only four 16-bit elements, two 32-bit elements, etc.). In one embodiment, the vector execution unit 204 may operate on some or all of the data elements that are included in vectors of operands. More particularly, the vector execution unit 204 may be configured to concurrently operate on different elements of a vector operand of a vector program instruction.

In one embodiment, the vector execution unit 204 may include a vector register file (not shown) which may include vector registers that can hold operand vectors and result vectors for the vector execution unit 204. In some embodiments, there may be 32 vector registers in the vector register file, and each vector register may include 128 bits. However, in alternative embodiments, there may be different numbers of vector registers and/or different numbers of bits per register.

The vector execution unit 204 may be configured to retrieve operands from the vector registers and to execute vector instructions that cause vector execution unit 204 to perform operations in parallel on some or all of the data elements in the operand vector. For example, vector execution unit 204 can perform logical operations, mathematical operations, or bitwise operations on the elements in the vector. Vector execution unit 204 may perform one vector operation per instruction cycle (although as described above, a "cycle" may include more than one clock cycle that may be used to trigger, synchronize, and/or control vector execution unit 204's computational operations).

In one embodiment, vector execution unit 204 may support vectors that hold N data elements (e.g., bytes, words, doublewords, etc.), where N may be any positive whole number. In these embodiments, vector execution unit 204 may perform operations on N or fewer of the data elements in an operand vector in parallel. For example, in an embodiment where the vector is 256 bits in length, the data elements being operated on are four-byte elements, and the operation is adding a value to the data elements, these embodiments can add the value to any number of the elements in the vector. It is noted that N may be different for different implementations of processor 102.

The vector execution unit 204 may, in various embodiments, include at least one control signal that enables the dynamic limitation of the data elements in an operand vector on which vector execution unit 204 operates. Specifically, depending on the state of the control signal, vector execution unit 204 may selectively operate on any or all of the data elements in the vector. For example, in an embodiment where the vector is 512 bits in length and the data elements being operated on are four-byte elements, the control signal can be asserted to prevent operations from being performed on some or all of 16 data elements in the operand vector. Note that "dynamically" limiting the data elements in the operand vector upon which operations are performed can involve asserting the control signal separately for each cycle at runtime.

In some embodiments, as described in greater detail below, based on the values contained in a vector of predicates or one or more scalar predicates, vector execution unit 204 applies vector operations to selected vector data elements only. In some embodiments, the remaining data elements in a result vector remain unaffected (which may also be referred to as "predication") or are forced to zero (which may also be referred to as "zeroing" or "zeroing predication"). In some embodiments, the clocks for the data element processing subsystems ("lanes") that are unused due to predication or zeroing in vector execution unit 204 can be power and/or clock-gated, thereby reducing dynamic power consumption in vector execution unit 204.

In various embodiments, the architecture may be vector-length agnostic to allow it to adapt parallelism at runtime. More particularly, when instructions or operations are vector-length agnostic, the operation may be executed using vectors of any length, up to the limitations imposed by the supporting hardware. For example, in embodiments in which vector execution hardware supports vectors that can include eight separate four-byte elements (thus having a vector length of eight elements), a vector-length agnostic operation can operate on any number of the eight elements in the vector. On a different hardware implementation that supports a different vector length (e.g., four elements), the vector-length agnostic operation may operate on the different number of elements made available to it by the underlying hardware. Thus, a compiler or programmer need not have explicit knowledge of the vector length supported by the underlying hardware (e.g., vector execution unit 204). In such embodiments, a compiler generates or a programmer writes program code that need not rely on (or use) a specific vector length. In some embodiments it may be forbidden to specify a specific vector size in program code. Thus, the compiled code in these embodiments (i.e., binary code) runs on other execution units that may have differing vector lengths, while potentially realizing performance gains from processors that support longer vectors. In such embodiments, the vector length may for a given hardware unit such as a processor may be read from a system register during runtime. Consequently, as process technology allows longer vectors, execution of legacy binary code simply speeds up without any effort by software developers.

Generally, vector lengths may be implemented as powers of two (e.g., two, four, eight, etc.). However, in some embodiments, vector lengths need not be powers of two. Specifically, vectors of three, seven, or another number of data elements can be used in the same way as vectors with power-of-two numbers of data elements.

In various embodiments, each data element in the vector can contain an address that is used by vector execution unit 204 for performing a set of memory accesses in parallel. In such embodiments, if one or more elements of the vector contain invalid memory addresses, invalid memory-read operations can occur. Accordingly, invalid memory-read operations that would otherwise result in program termination may instead cause any elements with valid addresses to be read and elements with invalid elements to be flagged, allowing program execution to continue in the face of speculative, and in hindsight illegal, read operations.

In some embodiments, processor 102 (and hence vector execution unit 204) is able to operate on and use vectors of pointers. In such embodiments, the number of data elements per vector is the same as the number of pointers per vector, regardless of the size of the data type. Instructions that operate on memory may have variants that indicate the size of the memory access, but elements in processor registers should be the same as the pointer size. In these embodiments, processors that support both 32-bit and 64-bit addressing modes may choose to allow twice as many elements per vector in 32-bit mode, thereby achieving greater throughput. This implies a distinct throughput advantage to 32-bit addressing, assuming the same width data path. Implementation-specific techniques can be used to relax the requirement. For example, double-precision floating-point numbers can be supported in 32-bit mode through register pairing or some other specialized mechanism.

Macroscalar Architecture Overview

An instruction set architecture (referred to as the Macroscalar Architecture) and supporting hardware may allow compilers to generate program code for loops without having to completely determine parallelism at compile-time, and without discarding useful static analysis information. Various embodiments of the Macroscalar Architecture will now be described. Specifically, as described further below, a set of instructions is provided that does not mandate parallelism for loops but, instead, enables parallelism to be exploited at runtime if dynamic conditions permit. Accordingly, the architecture includes instructions that enable code generated by the compiler to dynamically switch between non-parallel (scalar) and parallel (vector) execution for loop iterations depending on conditions at runtime by switching the amount of parallelism used.

Thus, the architecture provides instructions that enable an undetermined amount of vector parallelism for loop iterations but do not require that the parallelism be used at runtime. More specifically, the architecture includes a set of vector-length agnostic instructions whose effective vector length can vary depending on runtime conditions. Thus, if runtime dependencies demand non-parallel execution of the code, then execution occurs with an effective vector length of one element. Likewise, if runtime conditions permit parallel execution, the same code executes in a vector-parallel manner to whatever degree is allowed by runtime dependencies (and the vector length of the underlying hardware). For example, if two out of eight elements of the vector can safely execute in parallel, a processor such as processor 102 may execute the two elements in parallel. In these embodiments, expressing program code in a vector-length agnostic format enables a broad range of vectorization opportunities that are not present in existing systems.

In various embodiments, during compilation, a compiler first analyzes the loop structure of a given loop in program code and performs static dependency analysis. The compiler then generates program code that retains static analysis information and instructs a processor such as processor 102, for example, how to resolve runtime dependencies and to process the program code with the maximum amount of parallelism possible. More specifically, the compiler may provide vector instructions for performing corresponding sets of loop iterations in parallel, and may provide vector-control instructions for dynamically limiting the execution of the vector instructions to prevent data dependencies between the iterations of the loop from causing an error. This approach defers the determination of parallelism to runtime, where the information on runtime dependencies is available, thereby allowing the software and processor to adapt parallelism to dynamically changing conditions. An example of a program code loop parallelization is shown in FIG. 3.

Figure 3:
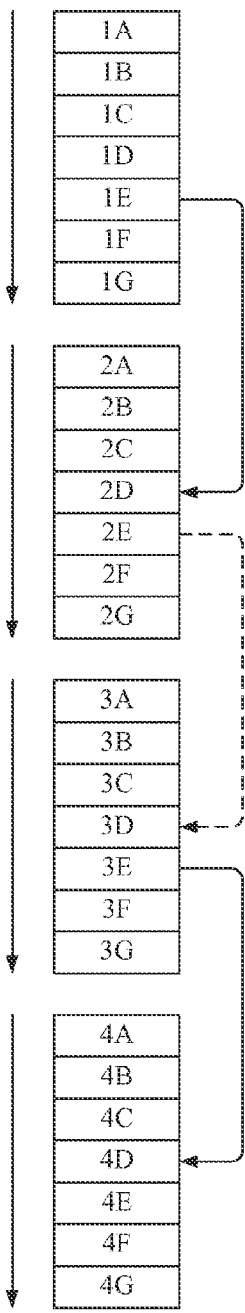
FIG. 3 is a diagram illustrating an example parallelization of a program code loop.

Referring to the left side of FIG. 3, an execution pattern is shown with four iterations (e.g., iterations 1-4) of a loop that have not been parallelized, where each loop includes instructions A-G. Serial operations are shown with instructions vertically stacked. On the right side of FIG. 3 is a version of the loop that has been parallelized. In this example, each instruction within an iteration depends on at least one instruction before it, so that there is a static dependency chain between the instructions of a given iteration. Hence, the instructions within a given iteration cannot be parallelized (i.e., instructions A-G within a given iteration are always serially executed with respect to the other instructions in the iteration). However, in alternative embodiments the instructions within a given iteration may be parallelizable.

As shown by the arrows between the iterations of the loop in FIG. 3, there is a possibility of a runtime data dependency between instruction E in a given iteration and instruction D of the subsequent iteration. However, during compilation, the compiler can only determine that there exists the possibility of data dependency between these instructions, but the compiler cannot tell in which iterations dependencies will actually materialize because this information is only available at runtime. In this example, a data dependency that actually materializes at runtime is shown by the solid arrows from 1E to 2D, and 3E to 4D, while a data dependency that doesn't materialize at runtime is shown using the dashed arrow from 2E to 3D. Thus, as shown, a runtime data dependency actually occurs between the first/second and third/fourth iterations.

Because no data dependency exists between the second and third iterations, the second and third iterations can safely be processed in parallel. Furthermore, instructions A-C and F-G of a given iteration have dependencies only within an iteration and, therefore, instruction A of a given iteration is able to execute in parallel with instruction A of all other iterations, instruction B can also execute in parallel with instruction B of all other iterations, and so forth. However, because instruction D in the second iteration depends on instruction E in the first iteration, instructions D and E in the first iteration must be executed before instruction D for the second iteration can be executed.

Accordingly, in the parallelized loop on the right side, the iterations of such a loop are executed to accommodate both the static and runtime data dependencies, while achieving maximum parallelism. More particularly, instructions A-C and F-G of all four iterations are executed in parallel. But, because instruction D in the second iteration depends on instruction E in the first iteration, instructions D and E in the first iteration must be executed before instruction D for the second iteration can be executed. However, because there is no data dependency between the second and third iterations, instructions D and E for these iterations can be executed in parallel.

Examples of the Macroscalar Architecture

The following examples introduce Macroscalar operations and demonstrate their use in vectorizing loops such as the loop shown in FIG. 3 and described above in the parallelized loop example. For ease of understanding, these examples are presented using pseudocode in the C++ format.

It is noted that the following example embodiments are for discussion purposes. The instructions and operations shown and described below are merely intended to aid an understanding of the architecture. However, in alternative embodiments, instructions or operations may be implemented in a different way, for example, using a microcode sequence of more primitive operations or using a different sequence of sub-operations. Note that further decomposition of instructions is avoided so that information about the macro-operation and the corresponding usage model is not obscured.

Notation

In describing the below examples, the following format is used for variables, which are vector quantities unless otherwise noted:

p5=a<b;

Elements of vector p5 are set to 0 or 1 depending on the result of testing a<b. Note that vector p5 can be a "predicate vector," as described in more detail below. Some instructions that generate predicate vectors also set processor status flags to reflect the resulting predicates. For example, the processor status flags or condition-codes can include the FIRST, LAST, NONE, and/or ALL flags.

~p5; a=b+c;

Only elements in vector 'a' designated by active (i.e., non-zero) elements in the predicate vector p5 receive the result of b+c. The remaining elements of a are unchanged. This operation is called "predication," and is denoted using the tilde ("~") sign before the predicate vector.

!p5; a=b+c;

Only elements in vector 'a' designated by active (i.e., non-zero) elements in the predicate vector p5 receive the result of b+c. The remaining elements of a are set to zero. This operation is called "zeroing," and is denoted using the exclamation point ("!") sign before the predicate vector.

```
if (FIRST( )) goto ...; // Also LAST( ), ANY( ), ALL( ),
CARRY( ), ABOVE( ), or NONE( ), (where ANY( ) ==
!NONE( ))
```

The following instructions test the processor status flags and branch accordingly.

x+=VECLEN;

VECLEN is a machine value that communicates the number of elements per vector. The value is determined at runtime by the processor executing the code, rather than being determined by the assembler.

//Comment

In a similar way to many common programming languages, the following examples use the double forward slash to indicate comments. These comments can provide information regarding the values contained in the indicated vector or explanation of operations being performed in a corresponding example.

In these examples, other C++-formatted operators retain their conventional meanings, but are applied across the vector on an element-by-element basis. Where function calls are employed, they imply a single instruction that places any value returned into a destination register. For simplicity in understanding, all vectors are vectors of integers, but alternative embodiments support other data formats.

Structural Loop-Carried Dependencies

In the code Example 1 below, a program code loop that is "non-vectorizable" using conventional vector architectures is shown. (Note that in addition to being non-vectorizable, this loop is also not multi-threadable on conventional multi-threading architectures due to the fine-grain nature of the data dependencies.) For clarity, this loop has been distilled to the fundamental loop-carried dependencies that make the loop unvectorizable.

In this example, the variables r and s have loop-carried dependencies that prevent vectorization using conventional architectures. Notice, however, that the loop is vectorizable as long as the condition (A[x]<FACTOR) is known to be always true or always false. These assumptions change when the condition is allowed to vary during execution (the common case). For simplicity in this example, we presume that no aliasing exists between A[ ] and B[ ].

EXAMPLE 1

Program Code Loop

```
r = 0;
s = 0;
for (x=0; x<KSIZE; ++x)
{
    if (A[x] < FACTOR)
    {
        r = A[x+s];
    }
    else
    {
        s = A[x+r];
    }
    B[x] = r + s;
}
```

Using the Macroscalar architecture, the loop in Example 1 can be vectorized by partitioning the vector into segments for which the conditional (A[x]<FACTOR) does not change. Examples of processes for partitioning such vectors, as well as examples of instructions that enable the partitioning, are presented below. It is noted that for this example the described partitioning need only be applied to instructions within the conditional clause. The first read of A[x] and the final operation B[x]=r+s can always be executed in parallel across a full vector, except potentially on the final loop iteration.

Instructions and examples of vectorized code are shown and described to explain the operation of a vector processor such as processor 102 of FIG. 2, in conjunction with the Macroscalar architecture. The following description is generally organized so that a number of instructions are described and then one or more vectorized code samples that use the instructions are presented. In some cases, a particular type of vectorization issue is explored in a given example.

dest=VectorReadInt(Base, Offset)

VectorReadInt is an instruction for performing a memory read operation. A vector of offsets, Offset, scaled by the data size (integer in this case) is added to a scalar base address, Base, to form a vector of memory addresses which are then read into a destination vector. If the instruction is predicated or zeroed, only addresses corresponding to active elements are read. In the described embodiments, reads to invalid addresses are allowed to fault, but such faults only result in program termination if the first active address is invalid.

VectorWriteInt(Base, Offset, Value)

VectorWriteInt is an instruction for performing a memory write operation. A vector of offsets, Offset, scaled by the data size (integer in this case) is added to a scalar base address, Base, to form a vector of memory addresses. A vector of values, Value, is written to these memory addresses. If this instruction is predicated or zeroed, data is written only to active addresses. In the described embodiments, writes to illegal addresses always generate faults.

dest=VectorIndex(Start, Increment)

VectorIndex is an instruction for generating vectors of values that monotonically adjust by the increment from a scalar starting value specified by Start. This instruction can be used for initializing loop index variables when the index adjustment is constant. When predication or zeroing is applied, the first active element receives the starting value, and the increment is only applied to subsequent active elements. For example:

x=VectorIndex(0,1); // x={0 1 2 3 4 5 6 7 }
    dest=PropagatePostT(dest, src, pred)

The PropagatePostT instruction propagates the value of active elements in src, as determined by pred, to subsequent inactive elements of dest. Active elements, and any inactive elements that precede the first active element, remain unchanged in dest. The purpose of this instruction is to take a value that is conditionally calculated, and propagate the conditionally calculated value to subsequent loop iterations as occurs in the equivalent scalar code. For example:

| Entry: | dest | = {8 | 9 | A | B | C | D | E | F} |
|---|---|---|---|---|---|---|---|---|---|
|  | src | = {1 | 2 | 3 | 4 | 5 | 6 | 7 | 8} |
|  | pred | = {0 | 0 | 1 | 1 | 0 | 0 | 1 | 0} |
| Exit: | dest | = {8 | 9 | A | B | 4 | 4 | E | 7} | dest=PropagatePriorF(src, pred)

The PropagatePriorF instruction propagates the value of the inactive elements of src, as determined by pred, into subsequent active elements in dest. Inactive elements are copied from src to dest. If the first element of the predicate is active, then the last element of src is propagated to that position. For example:

| Entry: | src | = {1 | 2 | 3 | 4 | 5 | 6 | 7 | 8} |
|---|---|---|---|---|---|---|---|---|---|
|  | pred | = {1 | 0 | 1 | 1 | 0 | 0 | 1 | 0} |
| Exit: | dest | = {8 | 2 | 2 | 2 | 5 | 6 | 6 | 8} | dest=ConditionalStop(pred, deps)

The ConditionalStop instruction evaluates a vector of predicates, pred, and identifies transitions between adjacent predicate elements that imply data dependencies as specified by deps. The scalar value deps can be thought of as an array of four bits, each of which designates a possible transition between true/false elements in pred, as processed from left to right. These bits convey the presence of the indicated dependency if set, and guarantee the absence of the dependency if not set. They are:

kTF—Implies a loop-carried dependency from an iteration for which the predicate is true, to the subsequent iteration for which the value of the predicate is false.

kFF—Implies a loop-carried dependency from an iteration for which the predicate is false, to the subsequent iteration for which the value of the predicate is false.

kFT—Implies a loop-carried dependency from an iteration for which the predicate is false, to the subsequent iteration for which the value of the predicate is true.

kTT—Implies a loop-carried dependency from an iteration for which the predicate is true, to the subsequent iteration for which the value of the predicate is true.

The element position corresponding to the iteration that generates the data that is depended upon is stored in the destination vector at the element position corresponding to the iteration that depends on the data. If no data dependency exists, a value of 0 is stored in the destination vector at that element. The resulting dependency index vector, or DIV, contains a vector of element-position indices that represent dependencies. For the reasons described below, the first element of the vector is element number 1 (rather than 0).

As an example, consider the dependencies in the loop of Example 1 above. In this loop, transitions between true and false iterations of the conditional clause represent a loop-carried dependency that requires a break in parallelism. This can be handled using the following instructions:

```
p1 = (t < FACTOR);              // p1 = {00001100}
p2 = ConditionalStop(p1, kTF|kFT);  // p2 = {00004060}
```

Because the 4th iteration generates the required data, and the 5th iteration depends on it, a 4 is stored in position 5 of the output vector p2 (which is the DIV). The same applies for the 7th iteration, which depends on data from the 6th iteration. Other elements of the DIV are set to 0 to indicate the absence of dependencies. (Note that in this example the first element of the vector is element number 1.)

dest=GeneratePredicates(Pred, DIV)

GeneratePredicates takes the dependency index vector, DIV, and generates predicates corresponding to the next group of elements that may safely be processed in parallel, given the previous group that was processed, indicated by pred. If no elements of Pred are active, predicates are generated for the first group of elements that may safely be processed in parallel. If Pred indicates that the final elements of the vector have been processed, then the instruction generates a result vector of inactive predicates indicating that no elements should be processed and the ZF flag is set. The CF flag is set to indicate that the last element of the results is active. Using the values in the first example, GeneratePredicates operates as follows:

```
Entry Conditions:  // i2 = {0 0 0 0 4 0 6 0}
p2 = 0;            // p2 = {0 0 0 0 0 0 0 0}
Loop2:
p2 = GeneratePredicates(p2,i2);  // p2'   = {1 1 1 1 0 0 0 0}
CF = 0, ZF = 0
if(!PLAST( )) goto Loop2         // p2''  = {0 0 0 0 1 1 0 0}
CF = 0, ZF = 0                   // p2''' = {0 0 0 0 0 0 1 1}
CF = 1, ZF = 0
```

From an initialized predicate p2 of all zeros, GeneratePredicates generates new instances of p2 that partition subsequent vector calculations into three sub-vectors (i.e., p', p'', and p'''). This enables the hardware to process the vector in groups that avoid violating the data dependencies of the loop.

Figures 4A, 4B:
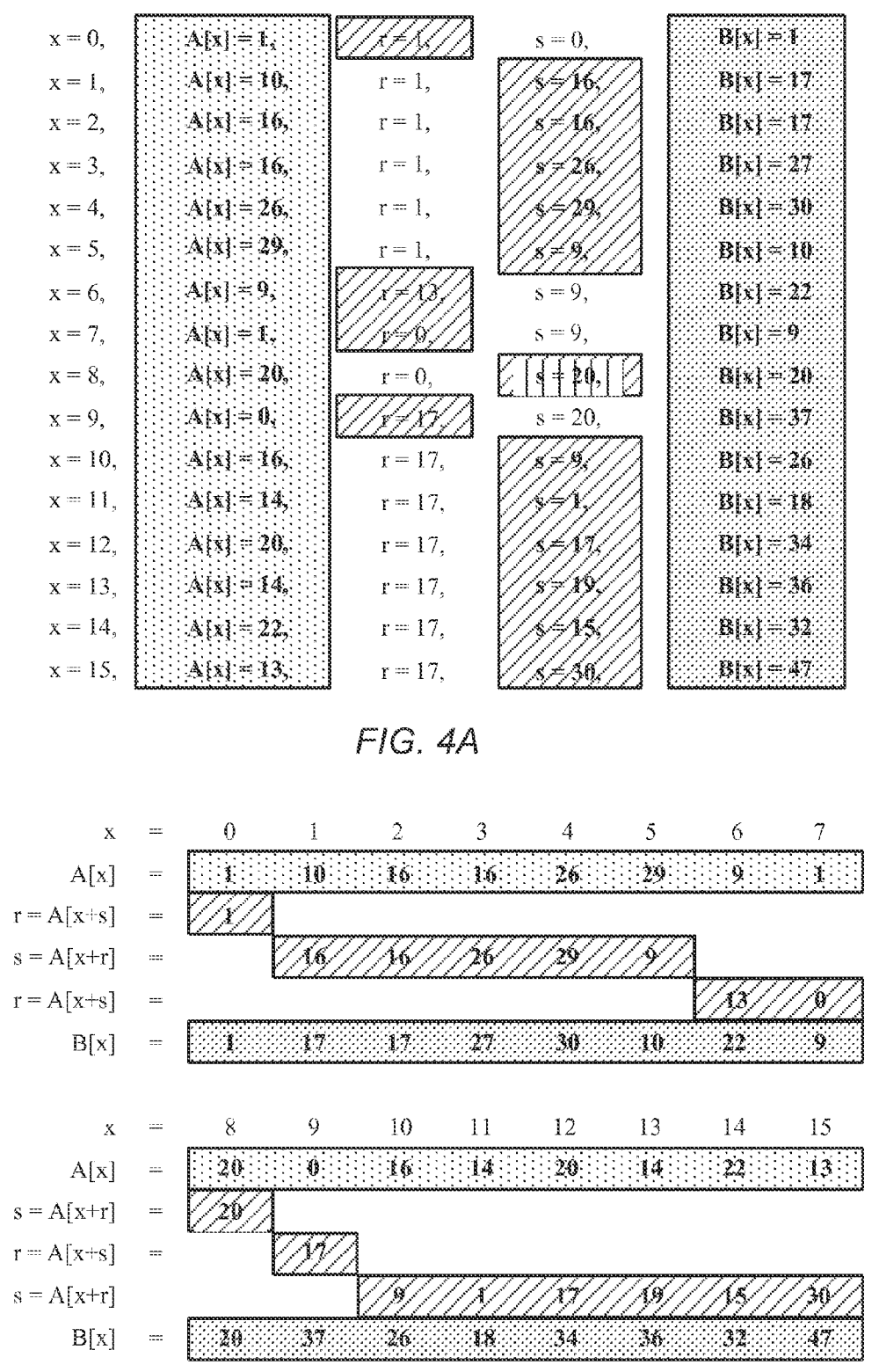

In FIG. 4A a diagram illustrating a sequence of variable states during scalar execution of the loop in Example 1 is shown. More particularly, using a randomized 50/50 distribution of the direction of the conditional expression, a progression of the variable states of the loop of Example 1 is shown. In FIG. 4B a diagram illustrating a progression of execution for Macroscalar vectorized program code of the loop of Example 1 is shown. In FIG. 4A and FIG. 4B, the values read from A[ ] are shown using leftward-slanting hash marks, while the values written to B[ ] are shown using rightward-slanting hash marks, and values for "r" or "s" (depending on which is changed in a given iteration) are shown using a shaded background. Observe that "r" never changes while "s" is changing, and vice-versa.

Nothing prevents all values from being read from A[ ] in parallel or written to B[ ] in parallel, because neither set of values participates in the loop-carried dependency chain. However, for the calculation of r and s, elements can be processed in parallel only while the value of the conditional expression remains the same (i.e., runs of true or false). This pattern for the execution of the program code for this loop is shown in of FIG. 4B. Note that the example uses vectors having eight elements in length. When processing the first vector instruction, the first iteration is performed alone (i.e., vector execution unit 204 processes only the first vector element), whereas iterations 1-5 are processed in parallel by vector execution unit 204, and then iterations 6-7 are processed in parallel by vector execution unit 204.

Referring to FIG. 5A and FIG. 5B, diagrams illustrating one embodiment of the vectorization of program code are shown. FIG. 5A depicts the original source code, while FIG. 5B illustrates the vectorized code representing the operations that may be performed using the Macroscalar architecture. In the vectorized code of FIG. 5B, Loop 1 is the loop from the source code, while Loop 2 is the vector-partitioning loop that processes the sub-vector partitions.

In the example, array A[ ] is read and compared in full-length vectors (i.e., for a vector of N elements, N positions of array A[ ] are read at once). Vector i2 is the DIV that controls partitioning of the vector. Partitioning is determined by monitoring the predicate p1 for transitions between false and true, which indicate loop-carried dependencies that should be observed. Predicate vector p2 determines which elements are to be acted upon at any time. In this particular loop, p1 has the same value in all elements of any sub-vector partition; therefore, only the first element of the partition needs to be checked to determine which variable to update.

After variable "s" is updated, the PropagatePostT instruction propagates the final value in the active partition to subsequent elements in the vector. At the top of the loop, the PropagatePriorF instruction copies the last value of "s" from the final vector position across all elements of the vector in preparation for the next pass. Note that variable "r" is propagated using a different method, illustrating the efficiencies of using the PropagatePriorF instruction in certain cases.

Software Speculation

In the previous example, the vector partitions prior to the beginning of the vector-partitioning loop could be determined because the control-flow decision was independent of the loop-carried dependencies. However, this is not always the case. Consider the following two loops shown in Example 2A and Example 2B:

EXAMPLE 2A

Program Code Loop 1

```
j = 0;
for (x=0; x<KSIZE; ++x)
{
   if (A[x] < FACTOR)
   {
      j = A[x+j];
   }
   B[x] = j;
}
```

EXAMPLE 2B

Program Code Loop 2

```
j = 0;
for (x=0; x<KSIZE; ++x)
{
```

-continued

```
   if (A[x+j] < FACTOR)
   {
      j = A[x];
   }
   B[x] = j;
}
```

In Example 2A, the control-flow decision is independent of the loop-carried dependency chain, while in Example 2B the control flow decision is part of the loop-carried dependency chain. In some embodiments, the loop in Example 2B may cause speculation that the value of "j" will remain unchanged and compensate later if this prediction proves incorrect. In such embodiments, the speculation on the value of "j" does not significantly change the vectorization of the loop.

In some embodiments, the compiler may be configured to always predict no data dependencies between the iterations of the loop. In such embodiments, in the case that runtime data dependencies exist, the group of active elements processed in parallel may be reduced to represent the group of elements that may safely be processed in parallel at that time. In these embodiments, there is little penalty for mispredicting more parallelism than actually exists because no parallelism is actually lost (i.e., if necessary, the iterations can be processed one element at a time, in a non-parallel way). In these embodiments, the actual amount of parallelism is simply recognized at a later stage.

dest=VectorReadIntFF(Base, Offset, pf)

VectorReadIntFF is a first-faulting variant of VectorReadInt. This instruction does not generate a fault if at least the first active element is a valid address. Results corresponding to invalid addresses are forced to zero, and flags pf are returned that can be used to mask predicates to later instructions that use this data. If the first active element of the address is unmapped, this instruction faults to allow a virtual memory system in computer system 100 (not shown) to populate a corresponding page, thereby ensuring that processor 102 can continue to make forward progress.

dest=Remaining(Pred)

The Remaining instruction evaluates a vector of predicates, Pred, and calculates the remaining elements in the vector. This corresponds to the set of inactive predicates following the last active predicate. If there are no active elements in Pred, a vector of all active predicates is returned. Likewise, if Pred is a vector of all active predicates, a vector of inactive predicates is returned. For example:

| Entry: | pred | = {0 0 1 0 1 0 0 0} |
| Exit: | dest | = {0 0 0 0 0 1 1 1} |

FIG. 6A and FIG. 6B are diagrams illustrating embodiments of example vectorized program code. More particularly, the code sample shown in FIG. 6A is a vectorized version of the code in Example 2A (as presented above). The code sample shown in FIG. 6B is a vectorized version of the code in Example 2B. Referring to FIG. 6B, the read of A[ ] and subsequent comparison have been moved inside the vector-partitioning loop. Thus, these operations presume (speculate) that the value of "j" does not change. Only after using "j" is it possible to determine where "j" may change value. After "j" is updated, the remaining vector elements are re-computed as necessary to iterate through the entire vector. The use of the Remaining instruction in the speculative code sample allows the program to determine which elements remain to be processed in the vector-partitioning loop before the program can determine the sub-group of these elements that are actually safe to process (i.e., that don't have unresolved data dependencies).

In various embodiments fault-tolerant read support is provided. Thus, in such embodiments, processor 102 may speculatively read data from memory using addresses from invalid elements of a vector instruction (e.g., VectorReadFF) in an attempt to load values that are to be later used in calculations. However, upon discovering that an invalid read has occurred, these values are ultimately discarded and, therefore, not germane to correct program behavior. Because such reads may reference non-existent or protected memory, these embodiments may be configured to continue normal execution in the presence of invalid but irrelevant data mistakenly read from memory. (Note that in embodiments that support virtual memory, this may have the additional benefit of not paging until the need to do so is certain.)

In the program loops shown in FIG. 6A and FIG. 6B, there exists a loop-carried dependency between iterations where the condition is true, and subsequent iterations, regardless of the predicate value for the later iterations. This is reflected in the parameters of the ConditionalStop instruction.

The sample program code in FIG. 6A and FIG. 6B highlights the differences between non-speculative and speculative vector partitioning. More particularly, in Example 2A memory is read and the predicate is calculated prior to the ConditionalStop. The partitioning loop begins after the ConditionalStop instruction. However, in Example 2B, the ConditionalStop instruction is executed inside the partitioning loop, and serves to recognize the dependencies that render earlier operations invalid. In both cases, the GeneratePredicates instruction calculates the predicates that control which elements are used for the remainder of the partitioning loop.

In the previous examples, the compiler was able to establish that no address aliasing existed at the time of compilation. However, such determinations are often difficult or impossible to make. The code segment shown in Example 3 below illustrates how loop-carried dependencies occurring through memory (which may include aliasing) are dealt with in various embodiments of the Macroscalar architecture.

EXAMPLE 3

Program Code Loop 3

```
for (x=0; x<KSIZE; ++x)
{
    r = C[x];
    s = D[x];
    A[x] = A[r] + A[s];
}
```

In the code segment of EXAMPLE 3, the compiler cannot determine whether A[x] aliases with A[r] or A[s]. However, with the Macroscalar architecture, the compiler simply inserts instructions that cause the hardware to check for memory hazards at runtime and partitions the vector accordingly at runtime to ensure correct program behavior. One such instruction that checks for memory hazards is the CheckHazardP instruction which is described below.

dest=CheckHazardP (first, second, pred)

The CheckHazardP instruction examines two vectors of a memory address (or indices) corresponding to two memory operations for potential data dependencies through memory. The vector 'first' holds addresses for the first memory operation, and vector 'second' holds the addresses for the second operation. The predicate 'pred' indicates or controls which elements of 'second' are to be operated upon. As scalar loop iterations proceed forward in time, vector elements representing sequential iterations appear left to right within vectors. The CheckHazardP instruction may evaluate in this context. The instruction may calculate a DIV representing memory hazards between the corresponding pair of first and second memory operations. The instruction may correctly evaluates write-after-read, read-after-write, and write-after-write memory hazards.

As with the ConditionalStop instruction described above, the element position corresponding to the iteration that generates the data that is depended upon may be stored in the destination vector at the element position corresponding to the iteration that is dependent upon the data. If no data dependency exists, a zero may be stored in the destination vector at the element position corresponding to the iteration that does not have the dependency. For example:

| Entry: | first  | = {2 3 4 5 6 7 8 9} |
|        | second | = {8 7 6 5 4 3 2 1} |
|        | pred   | = {1 1 1 1 1 1 1 1} |
| Exit:  | dest   | = {0 0 0 0 3 2 1 0} |

As shown above, element 5 of the first vector ("first") and element 3 of the second vector ("second") both access array index 6. Therefore, a 3 stored in position 5 of DIV. Likewise, element 6 of first and element 2 of second both access array index position 7, causing a 2 to be stored in position 6 of DIV, and so forth. A zero is stored in the DIV where no data dependencies exist.

In some embodiments, the CheckHazardP instruction may account for various sizes of data types. However, for clarity we describe the function of the instruction using only array index types.

The memory access in the example above has three memory hazards. However, in the described embodiments, only two partitions may be needed to safely process the associated memory operations. More particularly, handling the first hazard on element position 3 renders subsequent dependencies on lower or equally numbered element positions moot. For example:

| Entry Conditions:             | //DIV = {0 0 0 0 3 2 1 0} |
|                               | // p2  = {0 0 0 0 0 0 0 0} |
| p2 = GeneratePredicates(p2,DIV); | // p2 = {1 1 1 1 0 0 0 0} |
| P2 = GeneratePredicates(p2,DIV)  | // p2 = {0 0 0 0 1 1 1 1} |

The process used by the described embodiments to analyze a DIV to determine where a vector should be broken is shown in pseudocode below. In some embodiments, the vector execution unit 204 of processor 102 may perform this calculation in parallel. For example:

```
List = <empty>;
for (x=STARTPOS; x<VECLEN; ++x)
{
    if(DIV[x] in List)
        Break from loop;
    else if(DIV[x]>0)
```

```
    Append <x> to List;
}
```

The vector may safely be processed in parallel over the interval [STARTPOS,x), where x is the position where DIV[x]>0. That is, from STARTPOS up to (but not including) position x, where STARTPOS refers to the first vector element after the set of elements previously processed. If the set of previously processed elements is empty, then STARTPOS begins at the first element.

In some embodiments, multiple DIVs may be generated in code using ConditionalStop and/or CheckHazardP instructions. The GeneratePredicates instruction, however, uses a single DIV to partition the vector. There are two methods for dealing with this situation: (1) partitioning loops can be nested; or (2) the DIVs can be combined and used in a single partitioning loop. Either approach yields correct results, but the optimal approach depends on the characteristics of the loop in question. More specifically, where multiple DIVS are expected not to have dependencies, such as when the compiler simply cannot determine aliasing on input parameters, these embodiments can combine multiple DIVs into one, thus reducing the partitioning overhead. On the other hand, in cases with an expectation of many realized memory hazards, these embodiments can nest partitioning loops, thereby extracting the maximum parallelism possible (assuming the prospect of additional parallelism exists).

In some embodiments, DIVs may be combined using a VectorMax(A,B) instruction as shown below.

```
i2 = CheckHazardP(a,c,p0);   //i2 = {0 0 2 0 2 4 0 0}
i3 = CheckHazardP(b,c,p0);   //i3 = {0 0 1 3 3 0 0 0}
ix = VectorMax(i2,i3);       //ix = {0 0 2 3 3 4 0 0}
```

Because the elements of a DIV should only contain numbers less than the position of that element, which represent dependencies earlier in time, later dependencies only serve to further constrain the partitioning, which renders lower values redundant from the perspective of the GeneratePredicates instruction. Thus, taking the maximum of all DIVs effectively causes the GeneratePredicates instruction to return the intersection of the sets of elements that can safely be processed in parallel.

FIG. 7 is a diagram illustrating one embodiment of example vectorized program code. More particularly, the code sample shown in FIG. 7 is a vectorized version of the code in Example 3 (as presented above). Referring to FIG. 7, no aliasing exists between C[ ] or D[ ] and A[ ], but operations on A[ ] may alias one another. If the compiler is unable to rule out aliasing with C[ ] or D[ ], the compiler can generate additional hazard checks. Because there is no danger of aliasing in this case, the read operations on arrays C[ ] and D[ ] have been positioned outside the vector-partitioning loop, while operations on A[ ] remain within the partitioning loop. If no aliasing actually exists with A[ ], the partitions retain full vector size, and the partitioning loop simply falls through without iterating. However, for iterations where aliasing does occur, the partitioning loop partitions the vector to respect the data dependencies thereby ensuring correct operation.

In the embodiment shown in the code segment of FIG. 7, the hazard check is performed across the entire vector of addresses. In the general case, however, it is often necessary to check hazards between conditionally executed memory operations. The CheckHazardP instruction takes a predicate that indicates which elements of the second memory operation are active. If not all elements of the first operation are active, the CheckHazardP instruction itself can be predicated with a zeroing predicate corresponding to those elements of the first operand which are active. (Note that this may yield correct results for the cases where the first memory operation is predicated.)

The code segment in Example 4 below illustrates a loop with a memory hazard on array E[ ]. The code segment conditionally reads and writes to unpredictable locations within the array. In FIG. 8 a diagram illustrating one embodiment of example vectorized program code is shown. More particularly, the code sample shown in FIG. 8 is a vectorized Macroscalar version of the code in Example 4 (as presented above).

EXAMPLE 4

Program Code Loop 4

```
j = 0;
for (x=0; x<KSIZE; ++x)
{
    f = A[x];
    g = B[x];
    if (f < FACTOR)
    {
        h = C[x];
        j = E[h];
    }
    if (g < FACTOR)
    {
        i = D[x];
        E[i] = j;
    }
}
```

Referring to FIG. 8, the vectorized loop includes predicates p1 and p2 which indicate whether array E[ ] is to be read or written, respectively. The CheckHazardP instruction checks vectors of addresses (h and i) for memory hazards. The parameter p2 is passed to CheckHazardP as the predicate controlling the second memory operation (the write). Thus, CheckHazardP identifies the memory hazard(s) between unconditional reads and conditional writes predicated on p2. The result of CheckHazardP is zero-predicated in p1. This places zeroes in the DIV(ix) for element positions that are not to be read from E[ ]. Recall that a zero indicates no hazard. Thus, the result, stored in ix, is a DIV that represents the hazards between conditional reads predicated on p1 and conditional writes predicated on p2. This is made possible because non-hazard conditions are represented with a zero in the DIV.

It is noted that in the above embodiments, to check for memory-based hazards, the CheckHazardP instruction was used. As described above, the CheckHazardP instruction takes a predicate as a parameter that controls which elements of the second vector are operated upon. However, in other embodiments other types of CheckHazard instructions may be used. In one embodiment, this version of the CheckHazard instruction may simply operate unconditionally on the two input vectors. Regardless of which version of the CheckHazard instruction is employed, it is noted that as with any Macroscalar instruction that supports result predication and/or zeroing, whether or not the a given element of a result vector is modified by execution of the CheckHazard instruction may be separately controlled through the use of a predicate vector or zeroing vector, as described above. That is, the predicate parameter of the CheckHazardP instruction controls a different aspect of instruction execution than the general predicate/zeroing vector described above.

Instruction Definitions

The following sections include additional example instructions used in various embodiments of the Macroscalar architecture. The example instructions demonstrate various concepts used in implementing the Macroscalar architecture and therefore do not comprise a complete list of the possible instructions. Accordingly, it is contemplated that these concepts may be implemented using different arrangements or types of instructions without departing from the spirit of the described embodiments.

Unlike conventional single-instruction-multiple-data (SIMD) coding, in some embodiments, Macroscalar code can combine vector variables with scalar registers or immediate values. Thus, in these embodiments, Macroscalar instructions can directly reference scalar registers and immediate values without making unnecessary vector copies of them. As such, this may help avoid unnecessary vector-register pressure within a loop because more vector registers may be available rather than being required for making vector copies of scalars or immediate values.

The instructions are described using a signed-integer data type. However, in alternative embodiments, other data types or formats may be used. Moreover, although Macroscalar instructions may take vector, scalar, or immediate arguments in practice, only vector arguments are shown here to avoid redundancy.

The descriptions of the instructions reference vector elements with a zero-based numbering system (i.e., element "0" is the first element). However, as mentioned above, certain instructions, such as those involved in the processing of DIVs, express dependencies using 1-based element numbering, even though they are actually implemented using 0-based element numbering. Because of this, care should be taken to avoid confusing the language that the results are expressed in from the language used to implement the instructions.

For the purposes of discussion, the vector data type is defined as a C++ class containing an array v[ ] of elements that comprise the vector. Within these descriptions, as above, the variable VECLEN indicates the size of the vector. In some embodiments, VECLEN may be a constant.

Enhanced Macroscalar operations

In conventional SIMD vector architectures, vector elements are packed depending on the element width. For example, a 128-bit vector may represent sixteen 1-byte values, eight 2-byte values, four 4-byte values, or two 8-byte values depending on the instructions processing the vector. The length of the vector is defined by the architecture, and code is expressed in vector-length dependent form. While this is a highly efficient mechanism, it also means that such code is incompatible with changes in the vector length. For example, code written for a 128-bit SIMD vector typically must be modified to execute on a SIMD machine that supports, e.g. 256-bit SIMD vectors, because the number of elements of a given width per vector is not commensurate across the different vector lengths.

In conventional Macroscalar architectures, such as the examples discussed above, the element width is fixed, which causes the number of elements per vector to remain constant for a given CPU. Smaller values are extended to fit the fixed element width. For example, in a machine that supports four-element vectors, a 256-bit vector may represent four 1-byte values, four 2-byte values, four 4-byte values, or four 8-byte values depending on the size of data loaded into the vector. Furthermore, the length of the vector is not defined by the architecture, as it is with SIMD, and Macroscalar code is expressed in a vector-length agnostic form, such code being future-compatible with changes in the vector length. That is, different Macroscalar processors may implement vectors of varying lengths, depending, for example, on power consumption vs. performance tradeoffs, with more compact designs supporting fewer elements per vector and more performance-oriented designs supporting more elements per vector. Nevertheless, unlike SIMD code, Macroscalar code may natively execute on these various processor implementations without requiring modification to account for their hardware differences.

Conventional Macroscalar architectures fix the element width, resulting in a constant number of elements per vector for a given processor, because typically each element position corresponds to an iteration of a scalar loop that has been vectorized. While this fixed structure simplifies the task of vectorizing compilers and minimizes the number of vector instructions needed for a complete instruction-set-architecture, it may also limit parallelism in cases where small-sized data are being processed, and may limit the applicability of traditional SIMD hand-vectorization techniques that rely on a priori knowledge of the vector width.

As noted above, conventional SIMD vector architectures perform vector operations on elements of various widths in a packed format. For example, a SIMD vector add operation on a 32-bit processor with a 128-bit vector may require multiple instructions to add various element widths:

| | |
|---|---|
| SIMDVecAdd8(a, b) | Add sixteen 8-bit elements from vectors "a" and "b" |
| SIMDVecAdd16(a, b) | Add eight 16-bit elements from vectors "a" and "b" |
| SIMDVecAdd32(a, b) | Add four 32-bit elements from vectors "a" and "b" |

These SIMD operations function on an architecturally-defined vector width, assumed to be 128 bits in the above example.

In conventional Macroscalar architectures, the element width is fixed. For example, a Macroscalar vector "Add" operation on a 32-bit processor would add elements that were all 32-bit wide:

VecAdd(p,a,b) Add 32-bit elements predicated upon "p" from vectors "a" and "b"

This operation functions on an architecturally undefined vector length. The elements processed by this instruction are determined at run-time by predicate "p," instead of being determined by the architecture. (As noted above, particular processor implementations of the Macroscalar architecture may support different upper limits on the maximum number of vector elements that may be concurrently processed, although these limits may be transparent to the code.)

The advantage of conventional SIMD vector architectures that process different numbers of various width elements is that parallelism is increased. The disadvantages include the number of instructions required to express the various combinations of operations and element widths. Of greater concern, because the total width of the SIMD vector into which various elements are packed is defined by the architecture, it is difficult to perform auto-vectorization using SIMD and practically impossible to change the overall length of the vector without affecting binary compatibility.

In general, conventional Macroscalar architectures may facilitate auto-vectorization and enable the hardware vector length to be changed without affecting binary compatibility. The architecturally fixed-width element width of conventional Macroscalar vectors may present challenges in exploiting the potential parallelism available with data elements that are smaller than the element width. For example, if a processor supports concurrent operations on vectors of 32-bit elements, but a particular vector has elements that are only 8 or 16 bits wide, then processing resources that are fully utilized when operating on vectors of 32-bit elements may be underutilized when operating on the smaller-element vectors.

Enhanced Macroscalar Vector Operations, Predicate Operations and Predicate Registers In some embodiments of Macroscalar processors, enhanced Macroscalar vector instructions may be employed, which take enhanced predicates as inputs. Such enhanced predicates may also carry additional attributes, such as the element width, the length of the vector, or whether the vector should be viewed as fixed-length or vector-length agnostic. Such enhanced vector instructions may take an enhanced predicate operand that designates attributes such as element width along with the particular vector elements that are to be processed when the enhanced vector instructions are executed. This allows both the element width and the number of active elements per vector to be determined at runtime, thus alleviating the requirement that these parameters be specified in the architectural definition of the instruction (as is generally the case with SIMD instructions).

Such enhanced vector instructions may perform the requested operation on the elements specified by the enhanced predicate, assuming an element width also specified by the enhanced predicate (as discussed in greater detail below), and may return the execution result as a vector of elements of the same element width as specified by the enhanced predicate. For vector instructions that take multiple enhanced predicate operands, a fault may be generated if the element widths of the enhanced predicates do not match.

Example:

VecAddX(p,a,b) Add elements predicated upon "p" from vectors "a" and "b", where the width of the elements processed is also determined by "p"

Optional Zeroing or Masking predication may be applied to the result as specified by the form of the instruction. In the vector related instruction VecAddX above, the opcode of the instruction does not indicate the element size. Rather, in various embodiments as described herein, a parameter such as "p" may be used to indicate the element size. Similarly, other vector related instructions as described below may not indicate an element size as part of their opcode.

In addition to enhanced vector instructions, in some embodiments of Macroscalar processors, enhanced Macroscalar predicate instructions may be employed that process enhanced predicate operands that designate an element width and which elements are active. (Where the enhanced vector instructions may be understood to produce vectors of data elements dependent upon predicates, the enhanced predicate instructions may be understood to produce vectors of predicates themselves—e.g., to determine predicates that will condition the execution behavior of subsequent instructions.) The instructions may perform the requested operation dependent on the enhanced predicate, and return the result as an enhanced predicate having the same attributes. Flags may optionally be set to correspond to the result predicate. A fault may be generated if the attributes of all enhanced predicate operands do not match.

Example:

VecAndPPX(p,a,b) Logically AND predicates "a" and "b," predicated upon predicate "p," returning an enhanced predicate result where the enhanced predicate result contains attributes such as an element-width indicator that indicates the element width of the other operands Optional Zeroing or Masking predication may be applied to the result as specified by the form of the instruction.

The enhanced predicates specify the attributes of elements to be processed and which elements are active.

Conventional Macroscalar processors typically include predicate registers each containing a vector of predicates, where each predicate (e.g., each element of a predicate register) corresponds to a vector element of architecturally fixed width (e.g., a 32-bit element). In Macroscalar processors employing enhanced predicates, enhanced predicate registers may be provided. Each enhanced predicate register may store both a vector of predicates and attributes of the data corresponding to the predicates. Thus, the enhanced predicate register communicates not only what elements are active, but also other attributes such as the width of the elements, thus allowing packed vectors (i.e., vectors having multiple distinct smaller-sized data elements packed within a single element having an architecturally-defined width) to be expressed in a vector-length agnostic manner.

Thus, enhanced predicates specify both the attributes of data to be processed and which particular elements are to be processed. Such enhanced predicates may also carry additional attributes, such as the element width, the length of the vector, the sub-vector size, or whether the vector should be viewed as fixed-length or vector-length agnostic. The following example representations of enhanced predicate encoding may apply to any of the enhanced instructions described herein. In some embodiments, the element width indicator that indicates element width may be expressed as bit-field in the predicate register. For example:

00=8-bit element width
01=16-bit element width
10=32-bit element width
11=64-bit element width Information about the vector length may also be held in the enhanced predicate register. For example:

00=Vector-Length Agnostic
01=64-bit Vector
10=128-bit Vector
11=192-bit Vector

Information about a sub-vector segment size may also be held in the enhanced predicate register. For example:

00=Wide Vector (no sub-vector segments)
01=64-bit segments
10=128-bit segments
11=256-bit segments Sub-vector segments delineate operations into groups, typically for instructions that work across adjacent elements. This is illustrated by the VecSumAcrossZ Instruction, the behavior of which may be illustrated by the example code presented below.

EXAMPLE 1

Packed Predicate Representation

In a packed predicate representation, consecutive predicate (bit) positions correspond to consecutive element positions. A single predicate corresponds to a single element. If the two most significant bit positions correspond to the width of the element as indicated above, here are several examples of vector-length agnostic predicates. In these examples, a 16-bit predicate register is employed, with the 2 most significant bits being used to indicate attributes such as element size, and the remaining bits being used to encode predicate information for vector elements. These examples assume that vectors have at most 8 elements, although in other embodiments, different numbers of elements, different types and/or representations of attributes, and/or different encodings may be employed with respect to the enhanced predicate registers.

0000,0000,1111,1111=8-bit elements 0-7 active
0100,0000,0000,1111=16-bit elements 0-3 active
1000,0000,0000,0011=32-bit elements 0-1 active
0000,0000,1000,0000=8-bit element 7 active
0100,0000,0000,1000=16-bit element 3 active
1000,0000,0000,0010=32-bit element 1 active
0100,0000,0000,0010=16-bit element 1 active
0000,0000,0000,0010=8-bit element 1 active

EXAMPLE 2

Byte-aligned Representation

In a byte-aligned representation, a single predicate corresponds to a single element, but the predicates are aligned to the byte-position of the element within the vector, rather than being packed together. If the first 2 bit positions correspond to the width of the element as indicated above, here are several examples of vector-length agnostic predicates:

0000,0000,1111,1111=8-bit elements 0-7 active
0100,0000,1010,1010=16-bit elements 0-3 active
1000,0000,1000,1000=32-bit elements 0-1 active
0000,0000,1000,0000=8-bit element 7 active
0100,0000,1000,0000=16-bit element 3 active
1000,0000,1000,0000=32-bit element 1 active
0100,0000,0000,1000=16-bit element 1 active
0000,0000,0000,0010=8-bit element 1 active

EXAMPLE 3

Byte-enabled Representation

In a byte-enabled representation, predicates correspond to the individual bytes within an element, rather than corresponding to the elements themselves. If the first 2 bit positions correspond to the width of the element as indicated above, here are several examples of vector-length agnostic predicates:

0000,0000,1111,1111=8-bit elements 0-7 enabled
0100,0000,1111,1111=16-bit elements 0-3 enabled
1000,0000,1111,1111=32-bit elements 0-1 enabled
0000,0000,1000,0000=8-bit element 7 enabled
0100,0000,1100,0000=16-bit element 3 enabled
1000,0000,1111,0000=32-bit element 1 enabled
0100,0000,0000,1100=16-bit element 1 enabled
0000,0000,0000,0010=8-bit element 1 enabled Enhanced Macroscalar Comparison Operations In some Macroscalar embodiments, enhanced Macroscalar comparison instructions may be implemented. Such comparison instructions may take an enhanced predicate operand that designates attributes such as element width as well as which elements are to be processed. As with the general enhanced vector instructions discussed above, this allows both the attributes such as element width and the number of active elements per vector to be determined at runtime and thus need not be specified in the architectural definition of the instruction. This may further enable additional parallelism when processing smaller-sized data.

The instructions may perform the requested comparison on the elements specified by the enhanced predicate, assuming attributes such as element width also specified by the enhanced predicate, and may return the result as an enhanced predicate corresponding to the result of the comparison, with attributes such as element-width matching the input predicate operand.

Example:

VecCmpLTX(p,a,b) Compare elements of "a" and "b" predicated on "p," testing whether elements of "a" are less than elements of "b," where attributes such as the width of the elements processed is also determined by "p," and where the resulting predicate contains attributes such as an element-width indicator that matches the indicator in "p."

As with previous examples, optional Zeroing or Masking predication may be applied to the result as specified by the form of the instruction.

Enhanced Macroscalar True/False Operations

In conventional Macroscalar architectures, a vector of all-true or all-false predicates may typically be manifested by instructions (VecPTrue, and VecPFalse, respectively) that generate the predicates to correspond to the number of fixed-width elements supported by the underlying hardware. Enhancing the VecPTrue and VecPFalse instructions to support variable element widths may help increase parallelism for small-sized data. Accordingly, in some Macroscalar embodiments, enhanced VecPTrue and VecPFalse instructions may be implemented that generate enhanced predicates to correspond to the requested element width and/or vector length.

Examples:

VecPTrue(0,1) Returns a vector-length agnostic enhanced predicate where all 1-byte elements supported by the hardware are active and clears the 'Z' flag VecPTrue(0,2) Returns a vector-length agnostic enhanced predicate where all 2-byte elements supported by the hardware are active and clears the 'Z' flag VecPTrue(0,4) Returns a vector-length agnostic enhanced predicate where all 4-byte elements supported by the hardware are active and clears the 'Z' flag VecPTrue(0,8) Returns a vector-length agnostic enhanced predicate where all 8-byte elements supported by the hardware are active and clears the 'Z' flag VecPFalse(0,1) Returns a vector-length agnostic enhanced predicate where all 1-byte elements supported by the hardware are inactive and sets the 'Z' flag VecPFalse(0,2) Returns a vector-length agnostic enhanced predicate where all 2-byte elements supported by the hardware are inactive and sets the 'Z' flag VecPFalse(0,4) Returns a vector-length agnostic enhanced predicate where all 4-byte elements supported by the hardware are inactive and sets the 'Z' flag VecPFalse(0,8) Returns a vector-length agnostic enhanced predicate where all 8-byte elements supported by the hardware are inactive and sets the 'Z' flag VecPTrue(128,4) If the processor supports vector lengths of 128-bits or greater, returns a fixed-length enhanced predicate where 128 bits worth of 4-byte elements are active and clears the 'Z' flag. Otherwise, returns an enhanced predicate where all 4-byte elements are inactive and sets the 'Z' flag.

Figure 9:
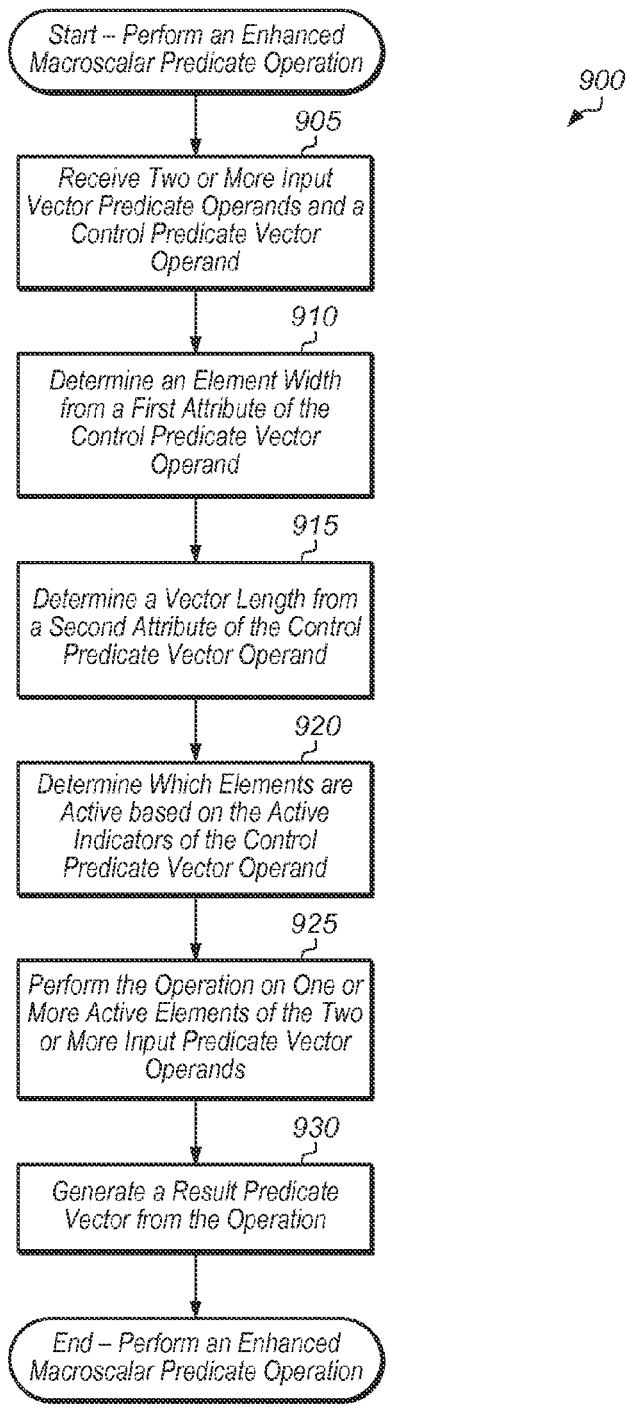
FIG. 9 is a generalized flow diagram illustrating one embodiment of a method for performing an enhanced Macroscalar predicate operation.

Referring now to FIG. 9, one embodiment of a method 900 for performing an enhanced Macroscalar predicate operation is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

A vector execution unit (e.g., vector execution unit 204 of FIG. 2) may receive two or more input predicate vector operands and a control predicate vector operand to initiate an operation (block 905). The two or more input predicate vector operands and control predicate vector operand may include a plurality of elements and one or more attributes. Next, the vector execution unit may determine an element width from a first attribute of the control predicate vector operand (block 910). The element width may be set to any of a plurality of values (e.g., 8, 16, 32, 64 bits).

Also, the vector execution unit may determine a vector length from a second attribute of the control predicate vector operand (block 915). The vector length may be set to any of a plurality of values (e.g., 64, 128, 192, 256 bits). Also, the vector execution unit may determine which elements are active based on the active indicators of the control predicate vector operand (block 920). Next, the vector execution unit may perform the operation on one or more active elements of the two or more input predicate vector operands (block 925). In one embodiment, the operation may be a Boolean operation including one or more of Boolean operators AND, OR, or NOT.

Then, the vector execution unit may generate a result predicate vector from the operation (block 930). As part of generating the result predicate vector from the operation, one or more flags may be set corresponding to the result predicate vector and/or optional zeroing or masking predication may be applied to the result predicate vector as specified by the operation. After block 930, method 900 may end.

The following example code sequence illustrates the functional behavior of particular embodiments of various enhanced Macroscalar instructions discussed above. Specifically, it illustrates possible behavior for variants of the VecAdd, VecAnd, and VecCmp instructions with enhanced predicates, as well as the VecPTrue, VecPFalse, and, VecSumAcross instructions discussed above. It is noted that although this example code sequence serves as one possible illustration of instruction behavior, other variants and expressions of both the instructions and their functional representation are possible and contemplated.

```
#include <math.h>
#include <stdlib.h>
#include <stdio.h>
#include <stdint.h>
#include <assert.h>
#define Assert(cond,msg)assert(((uint64_t)msg,cond))
unsigned const gTable[4] = {8,4,2,1};
#define MIN(a,b) ((a) < (b) ? (a) : (b))
#define kRegWidth      56
#define kQuanta        64
#define kNumQuanta     (kRegWidth/kQuanta)
typedef union _vect
{
   uint8_t      v1 [kRegWidth/8];
   uint16_t     v2 [kRegWidth/16];
   uint32_t     v4 [kRegWidth/32];
   uint64_t     v8 [kRegWidth/64];
}Vector;
typedef struct _pred
{
   uint64_t bits;
   union
   {
      uint16_t attr;
      struct
      {
         unsigned eWidth   : 4;// Element width, as 2^x bytes
         unsigned vLen     : 4;// Vector Length, in Quanta
         unsigned pSize    : 4;// Partition Size, in Quanta
                               // Should be Po2 quanta or bytes
      };
   };
}Pred;
Pred VecPTrue(unsigned vLength, unsigned pSize, unsigned eWidth);
Pred VecPFalse(unsigned vLength, unsigned pSize, unsigned eWidth);
Vector VecIndexZ(Pred const &p, unsigned a, unsigned b);
Pred VecAndPZ(Pred &p, Pred &a, Pred &b);
Pred VecCmpEQZ(Pred &p, Vector &a, Vector &b);
Vector VecAddZ(Pred &p, Vector &a, Vector &b);
void PrintVector(Pred &p, Vector &r);
Vector VecSumAcrossZ(Pred &p, Vector &a, Vector &b);
//*************************************************
#define Active(p,x) ((p.bits & (1LL<<(x))) != 0)
#define NumElem(p) ((p.vLen ? p.vLen : kNumQuanta) * gTable[p.eWidth])
#define NumParts(p) (p.vLen ? (p.pSize ? p.vLen/p.pSize : 1) : 1)
#define ElemPerPart(p) ((p.vLen ? (p.pSize ? p.pSize : p.vLen) : kNumQuanta) * gTable[p.eWidth])
//*************************************************
int main(void)
{
   Pred p0,p1;
   p0 = VecPTrue(0,0,32);
   printf("p0 = %04x %016llx\n",p0.attr,p0.bits);
   p1 = VecPTrue(256,128,32);
   printf("p1 = %04x %016llx\n",p1.attr,p1.bits);
   Vector v0 = VecIndexZ(p0,0,1);
   PrintVector(p0,v0);
   Vector v1 = VecIndexZ(p0,0,1);
   PrintVector(p0,v1);
   Vector c = VecSumAcrossZ(p1,v0,v1);
   PrintVector(p0,c);
   printf("p0 = %04x %016llx\n",p0.attr,p0.bits);
   return(0);
}
//*************************************************
void PrintVector(Pred &p, Vector &r)
{
   int x;
   int numElem = NumElem(p);
   switch(p.eWidth)
   {
      case 0:           // 8-bits
         for (x=0; x<numElem; ++x)
            printf("%3lld ",(uint64_t)(r.v1[x]));
         break;
      case 1:           // 16-bits
         for (x=0; x <numElem; ++x)
            printf("%3ld ", (uint64_t)(r.v2[x]))
         break;
      case 2:           // 32-bits
         for (x=0; x<numElem; ++x)
            printf("%3lld ",(uint64_t)(r.v4[x]));
         break;
      case 3:           // 64-bits
         for (x=0; x<numElem; ++x)
            printf("%3lld ",(uint64_t)(r.v8[x]));
         break;
      default:
         Assert(0,"Bad eWidth");
         break;
   }
}
```

```
      printf("\n");
      return;
   }
//****************************************************
Vector VecIndexZ(Pred const &p, unsigned a, unsigned b)
{
   int x,y;
   Vector r;
   for (x=0; x<kNumQuanta; ++x)
      r.v8[x] = 0;
   int parts = NumParts(p);
   int perPart = ElemPerPart(p);
   uint64_t subtot;
   switch(p.eWidth)
   {
      case 0:         // 8-bits
         for (y=0; y<parts; ++y)
         {
            subtot = a;
            for (x=0; x<perPart; ++x)
               if (Active(p,y*perPart+x))
               {
                  subtot += b;
                  r.v1[y*perPart+x] = (uint8_t) subtot;
               }
         }
         break;
      case 1:         // 16-bits
         for (y=0; y<parts; ++y)
         {
            subtot = a;
            for (x=0; x<perPart; ++x)
               if (Active(p,y*perPart+x))
               {
                  subtot += b;
                  r.v2[y*perPart+x] = (uint16_t) subtot;
               }
         }
         break;
      case 2:         // 32-bits
         for (y=0; y<parts; ++y)
         {
            subtot = a;
            for (x=0; x<perPart; ++x)
               if (Active(p,y*perPart+x))
               {
                  subtot += b;
                  r.v4[y*perPart+x] = (uint32_t) subtot;
               }
         }
         break;
      case 3:         // 64-bits
         for (y=0; y<parts; ++y)
         {
            subtot = a;
            for (x=0; x<perPart; ++x)
               if (Active(p,y*perPart+x))
               {
                  subtot += b;
                  r.v8[y*perPart+x] = (uint64_t) subtot;
               }
         }
         break;
      default:
         break;
   }
   return(r);
}
//****************************************************
Pred VecPTrue(unsigned vLength, unsigned pSize,
unsigned eWidth)
{
   int x;
   Pred r;
   r.bits = 0;
   r.attr = 0;
   Assert(eWidth,"Zero-Width Elements Not Allowed");
   Assert(eWidth%8==0,"ERROR - Width must be a
multiple of 8 bits");
   Assert(vLength%64==0,"ERROR - Width must be a
multiple of 64 bits");
   Assert(pSize%64==0,"ERROR - Partition Size must
be a multiple of 64 bits");
   switch(eWidth)
   {
      case 8:
         r.eWidth = 0;
         break;
      case 16:
         r.eWidth = 1;
         break;
      case 32:
         r.eWidth = 2;
         break;
      case 64:
         r.eWidth = 3;
         break;
      default:
         Assert(0,"Bogus eWidth");
   }
   r.vLen = vLength / kQuanta;
   r.pSize = pSize / kQuanta;
   int numElem = NumElem(r);
   for (x=0; x<numElem; ++x)
      r.bits |= (1<<x);
   return(r);
}
//****************************************************
Pred VecPFalse(unsigned vLength, unsigned pSize,
unsigned eWidth)
{
   Pred r;
   r.bits = 0;
   r.attr = 0;
   Assert(eWidth,"Zero-Width Elements Not Allowed");
   Assert(eWidth%8==0,"ERROR - Width must be a
multiple of 8 bits");
   Assert(vLength%64==0,"ERROR - Width must be a
multiple of 64 bits");
   Assert(pSize%64==0,"ERROR - Partition Size must
be a multiple of 64 bits");
   switch(eWidth)
   {
      case 8:
         r.eWidth = 0;
         break;
      case 16:
         r.eWidth = 1;
         break;
      case 32:
         r.eWidth = 2;
         break;
      case 64:
         r.eWidth = 3;
         break;
      default:
         Assert(0,"Bogus eWidth6");
   }
   r.vLen = vLength / kQuanta;
   r.pSize = pSize / kQuanta;
   return(r);
}
//****************************************************
Pred VecAndPZ(Pred &p, Pred &a, Pred &b)
{
   int x;
   Pred r;
   r.bits = 0;
   r.attr = p.attr;         // Copy attributes
   Assert(p.attr == a.attr,"ERROR - Attribute Mismatch");
   Assert(p.attr == b.attr,"ERROR - Attribute Mismatch");
   uint64_t t = a.bits & b.bits;// Perform the operation
on all bits
```

-continued

```
for (x=0; x<Num Elem(p); ++x)// Apply predication
to results;
    if (Active(p,x))
        r.bits |= (t & (1LL << x));
return(r);
}
//****************************************************
Pred VecCmpEQZ(Pred &p, Vector &a, Vector &b)
{
    int x;
    Pred r;
    r.bits = 0;
    r.attr = p.attr;           // Copy attributes
    int numElem = NumElem(p);
    switch(p.eWidth)
    {
        case 0:         // 8-bits
            for (x=0; x<numElem; ++x)
                if (Active(p,x))
                    r.bits |= (a.v1[x] == b.v1[x]) << x;
            break;
        case 1:         // 16-bits
            for (x=0; x<numElem; ++x)
                if (Active(p,x))
                    r.bits |= (a.v2[x] == b.v2[x]) << x;
            break;
        case 2:         // 32-bits
            for (x=0; x<numElem; ++x)
                if (Active(p,x))
                    r.bits |= (a.v4[x] == b.v4[x]) << x;
            break;
        case 3:         // 64-bits
            for (x=0; x<numElem; ++x)
                if (Active(p,x))
                    r.bits |= (a.v8[x] == b.v8[x]) << x;
            break;
        default:
            break;
    }
    return(r);
}
//****************************************************
Vector VecAddZ(Pred &p, Vector &a, Vector &b)
{
    int x;
    Vector r;
    for (x=0; x<kNumQuanta; ++x)
        r.v8[x] = 0;
    int numElem = NumElem(p);
    switch(p.eWidth)
    {
        case 0:         // 8-bits
            for (x=0; x<numElem; ++x)
                if (Active(p,x))
                    r.v1[x] = a.v1[x] + b.v1[x];
            break;
        case 1:         // 16-bits
            for (x=0; x<numElem; ++x)
                if (Active(p,x))
                    r.v2[x] = a.v2[x] + b.v2[x];
            break;
        case 2:         // 32-bits
            for (x=0; x<numElem; ++x)
                if (Active(p,x))
                    r.v4[x] = a.v4 [x] + b.v4[x];
            break;
        case 3:         // 64-bits
            for (x=0; x<numElem; ++x)
                if (Active(p,x))
                    r.v8[x] = a.v8[x] + b.v8[x];
            break;
        default:
            break;
    }
    return(r);
}
//****************************************************
Vector VecSumAcrossZ(Pred &p, Vector &a, Vector &b)
{
```

-continued

```
    int x,y;
    Vector r;
    for (x=0; x<kNumQuanta; ++x)
        r.v8[x] = 0;
    int parts = NumParts(p);
    int perPart = ElemPerPart(p);
    uint64_t subtot;
    switch(p.eWidth)
    {
        case 0:         // 8-bits
            for (y=0; y<parts; ++y)
            {
                subtot = 0;
                for (x=0; x<perPart; ++x)
                    if (Active(p,y*perPart+x))
                    {
                        subtot += a.v1[y*perPart+x] + b.v1
                        [y*perPart+x];
                        r.v1[y*perPart+x] = subtot;
                    }
            }
            break;
        case 1:         // 16-bits
            for (y=0; y<parts; ++y)
            {
                subtot = 0;
                for (x=0; x<perPart; ++x)
                    if (Active(p,y*perPart+x))
                    {
                        subtot += a.v2[y*perPart+x] + b.v2
                        [y*perPart+x];
                        r.v2[y*perPart+x] = subtot;
                    }
            }
            break;
        case 2:         // 32-bits
            for (y=0; y<parts; ++y)
            {
                subtot = 0;
                for (x=0; x<perPart; ++x)
                    if (Active(p,y*perPart+x))
                    {
                        subtot += a.v4[y*perPart+x] + b.v4
                        [y*perPart+x];
                        r.v4[y*perPart+30x] = subtot;
                    }
            }
            break;
        case 3:         // 64-bits
            for (y=0; y<parts; ++y)
            {
                subtot = 0;
                for (x=0; x<perPart; ++x)
                    if (Active(p,y*perPart+x))
                    {
                        subtot += a.v8[y*perPart+x] + b.v8
                        [y*perPart+x];
                        r.v8[y*perPart+x] = subtot;
                    }
            }
            break;
        default:
            break;
    }
    return(r);
}
```

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:

performing, by a processor:

determining data dependencies between instructions corresponding to at least two iterations of a loop, wherein each of the two iterations of the loop use different elements of a given input vector;

generating a first control predicate vector based at least upon the data dependencies, wherein the first control predicate vector indicates:
 a number of elements that may be processed in parallel; and
 an element width to use when performing a first vector operation that uses the first control predicate vector as an operand, wherein the element width can be set to one of a plurality of values;

performing the first vector operation on a plurality of elements of two or more input predicate vector operands including the first control predicate vector to generate a result predicate vector, wherein a size of the plurality of elements processed by the first vector operation is based on the element width included in the first control predicate vector; and using the result predicate vector from the first vector operation as a second control predicate vector in a second vector operation.

2. The method as recited in claim 1, wherein the result predicate vector includes at least an element-width attribute that indicates the element width of operands for the second vector operation.

3. The method as recited in claim 1, wherein a number of elements processed is based on the element width and a vector length specified by the first control predicate vector.

4. The method as recited in claim 1, wherein the result predicate vector inherits one or more attributes from the control predicate vector operand.

5. The method as recited in claim 1, wherein the indicated number of elements that may be processed in parallel is greater than a number of elements that can be processed in parallel by the processor.

6. The method as recited in claim 1, further comprising setting one or more flags to correspond to the result predicate vector.

7. The method as recited in claim 1, wherein the two or more input predicate vector operands designate a plurality of attributes, wherein the plurality of attributes include an element width attribute, and wherein the method further comprising generating a fault if element widths do not match between the two or more input predicate vector operands.

8. A processor configured to:
 determine data dependencies between instructions corresponding to at least two iterations of a loop, wherein each of the two iterations of the loop use different elements of a given input vector;
 generate a first control predicate vector based at least upon the data dependencies, wherein the first control predicate vector indicates:
  a number of elements that may be processed in parallel; and
  an element width to use when performing a first vector operation that uses the first control predicate vector as an operand, wherein the element width can be set to one of a plurality of values;
 perform the first vector operation on a plurality of elements of two or more input predicate vector operands including the first control predicate vector to generate result predicate vector, wherein a size of the plurality of elements processed by the first vector operation is based on the element width included in the first control predicate vector; and
 use the result predicate vector from the first vector operation as a second control predicate vector in a second vector operation.

9. The processor as recited in claim 8, wherein the result predicate vector includes at least an element-width attribute that indicates the element width of operands for the second vector operation.

10. The processor as recited in claim 8, wherein a second attribute designated by the control predicate vector operand is a vector length.

11. The processor as recited in claim 10, wherein the second attribute indicates that the vector length is one of 64 bits, 128 bits, or 192 bits.

12. The processor as recited in claim 10, wherein the second attribute indicates that the two or more input predicate operands and the control predicate vector operand are vector-length agnostic.

13. The processor as recited in claim 8, wherein the processor is further configured to indicate a number of elements that may be processed in parallel, wherein the number of elements is greater than a number of elements that can be processed in parallel by the processor.

14. The processor as recited in claim 8, wherein optional zeroing or masking predication can be applied to the result predicate vector as specified by the operation.

15. A system comprising:
 a memory; and
 a processor coupled to the memory, wherein the processor is configured to:
  determine data dependencies between instructions corresponding to at least two iterations of a loop, wherein each of the two iterations of the loop use different elements of a given input vector;
  generate a first control predicate vector based at least upon the data dependencies, wherein the first control predicate vector indicates:
   a number of elements that may be processed in parallel; and
   an element width to use when performing a first vector operation that uses the first control predicate vector as an operand, wherein the element width can be set to one of a plurality of values;
  perform the first vector operation on a plurality of elements of two or more input predicate vector operands including the first control predicate vector to generate result predicate vector, wherein a size of the plurality of elements processed by the first vector operation is based on the element width included in the first control predicate vector; and
  use the result predicate vector from the first vector operation as a second control predicate vector in a second vector operation.

16. The system as recited in claim 15, wherein the control predicate vector operand is encoded according to one of a packed predicate representation, byte-aligned representation, or byte-enabled representation.

17. The system as recited in claim 15, wherein the two or more input predicate vector operands are encoded according to one of a packed predicate representation, byte-aligned representation, or byte-enabled representation.

18. The system as recited in claim 15, wherein the operation is a Boolean operation, and wherein the Boolean operation includes one or more of Boolean operators AND, OR, or NOT.

19. The system as recited in claim 15, wherein a second attribute designated by the control predicate vector operand is a vector length.

20. The system as recited in claim 19, wherein the vector length can be set to one of a plurality of values.

* * * * *